(12) United States Patent
Avni et al.

(10) Patent No.: US 7,424,462 B2
(45) Date of Patent: Sep. 9, 2008

(54) APPARATUS FOR AND METHOD OF PATTERN RECOGNITION AND IMAGE ANALYSIS

(75) Inventors: Yossi Avni, Herzelia (IL); Eytan Suchard, Kyriut Byalik (IL)

(73) Assignee: Applied Neural Technologies Limited of Woodbourne Hall, Tortola (BV)

(*) Notice: Subject to any disclaimer, the term of this patent is extended or adjusted under 35 U.S.C. 154(b) by 1018 days.

(21) Appl. No.: 10/810,651

(22) Filed: Mar. 29, 2004

(65) Prior Publication Data

US 2005/0163384 A1 Jul. 28, 2005

Related U.S. Application Data

(63) Continuation-in-part of application No. 10/144,754, filed on May 15, 2002, now Pat. No. 6,735,336.

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06K 9/00 | (2006.01) |
| G06K 9/56 | (2006.01) |
| G06K 9/68 | (2006.01) |

(52) U.S. Cl. .................. 706/20; 382/156; 382/169; 382/218; 382/205

(58) Field of Classification Search .................. 706/20; 382/156, 169, 218, 205

See application file for complete search history.

(56) References Cited

FOREIGN PATENT DOCUMENTS

WO    WO 97/04400    *    2/1997

* cited by examiner

*Primary Examiner*—David Vincent
*Assistant Examiner*—Ben M Rifkin
(74) *Attorney, Agent, or Firm*—Fulbright & Jaworski L.L.P.

(57) ABSTRACT

A method of comparing an input pattern with a memory pattern includes the steps of loading a representation of said input pattern into cells in an input layer; loading a representation of said memory pattern into cells in a memory layer; loading an initial value into cells in an intermediate layers between said input layer and said memory layer; comparing values of cells in said intermediate layers with values stored in cells of adjacent layers; updating values stored in cells in said intermediate layers based on said step of comparing; and mapping cells in said memory layer to cells in said input layer.

40 Claims, 12 Drawing Sheets

| | | | | | | | |
|---|---|---|---|---|---|---|---|
|201—|8.5|8.0|2.4|7.5|11.3|8.0|8.0|7.5|
|203—|8.5|8.0|2.4|7.5|11.3|8.0|8.0|7.5|
|204—|8.5|8.0|2.4|7.5|11.3|8.0|8.0|7.5|
|205—|9.0|9.0|6.0|9.2|10.0|10.0|9.4|9.1|
|206—|9.0|9.0|6.0|9.2|10.0|10.0|9.4|9.1|
|202—|9.0|9.0|6.0|9.2|10.0|10.0|9.4|9.1|

APPARATUS FOR AND METHOD OF PATTERN RECOGNITION AND IMAGE ANALYSIS

RELATED APPLICATIONS

This application is a continuation-in-part (CIP) of U.S. patent application Ser. No. 10/144,754 filed May 15, 2002 which claims priority to U.S. Provisional Patent Application Ser. No. 60/291,000, filed on May 16, 2001.

FIELD OF THE INVENTION

The present invention is directed to methods of and systems for information processing, information mapping, pattern recognition and image analysis in computer systems.

BACKGROUND

With the increasing proliferation of imaging capabilities, information transactions in computer systems increasingly require the identification and comparison of digital images. In addition to, conventional viewable digital images, other types of information, both viewable and non-viewable, are subject to pattern analysis and matching. Image identification and pattern analysis/recognition is usually dependent on analysis and classification of predetermined features of the image. Accurately identifying images using a computer system is complicated by relatively minor data distorting the images or patterns resulting from changes caused when, for example, are shifted, rotated or otherwise deformed.

Object invariance is a field of visual analysis which deals with recognizing an object despite distortion such as that caused by shifting, rotation, other affine distortions, cropping, etc. Object invariance is used primarily in visual comparison tasks. Identification of a single object or image within a group of objects or images also complicates the image identification process. Selective attention, or "priming", deals with how a visual object can be separated from its background or other visual objects comprising distractions.

Current pattern recognition, image analysis and information mapping systems typically employ a Bayesian Logic. Bayesian Logic predicts future events through the use of knowledge derived from prior events. In computer applications, Bayesian Logic relies on prior events to formulate or adjust a mathematical model used to calculate the probability of a specific event in the future. Without prior events on which to base a mathematical model, Bayesian Logic is unable to calculate the probability of a future event. Conversely, as the number of prior events increases, the accuracy of the mathematical model increases as does the accuracy of the resulting prediction from the Bayesian Logic approach.

Currently, two common paradigms accommodating some degree of distortion (i.e., image deformation) of a visual object under deformations; point-to-point mapping and high order statistics. Point-to-point, or matching with shape contexts, achieves measurement stability by identifying one or more sub-patterns with the overall patterns or images being compared. Once these sub-patterns are identified, the statistical features of sub-patterns are compared to determine agreement between the two images. Point-to-point mapping methodologies are further described in "Matching with Shape Contexts" by Serge Belongie and Jitendra Malik in June, 2000 during the IEEE Workshop On Content-based Access of Image and Video Libraries (CBAIVL). A second method of point-to-point mapping is what/where networks and assessments of lie groups of transformations based on back propagation networks. In this method an optimal transformation is identified for a feature in a first image and is used to compare the same feature in a second image. This approach deconstructs the image into a sum or a multiplicity of functions. These functions are then mapped to an appropriately deconstructed image function of a compared, or second image. What/where networks have been used by Dr. Rajesh Rao and Dana Ballard from the Salk Institute in La Hoya, Calif. The point-to-point mapping techniques described attempt to map a test or input image to a reference or target image that is either stored in memory directly or is encoded into memory. The point-to-point approach achieves limited image segmentation and mappings through the use of a statistical approach.

In the high order statistical approach both the original input image and the compare target image are mapped into a high dimensional space and statistical measurements are performed on the images in the high dimensional space. These high order statistical measurements are compared to quantity an amount of agreement between the two images indicative of image similarity. This approach is used by Support Vector Machines, High Order Clustering (Hava Siegelmann and Hod Lipson) and Tangent Distance Neural Networks (TDNN). Support Vector Machines are described by Nello Christianini and John Shawe-Taylor ISBN 0-521-78019-5.

Both the point-to-point mapping and the high order statistics approach have been used in an attempt to recognize images subject to various transformations due to shifting, rotation and other deformations of the subject. These approaches are virtually ineffective for effectively isolating a comparison object (selective attention) from the background or other visual objects.

In contrast to these two common paradigms, the human brain may compare two objects or two patterns using "insight" without the benefit of prior knowledge of the objects or the patterns. A Gestalt approach to comparing objects or comparing patterns attempts to include the concept of insight by focusing on the whole object rather than individual portions of the object. Gestalt techniques have not been applied to computer systems to perform pattern recognition, image analysis or information mapping. Gestalt mapping is further described in Vision Science-Photons to Phenomenology by Stephen E. Plamer, ISBN 0-262-16183-4.

SUMMARY

According to one aspect of the present invention, a method of comparing an input pattern with a memory pattern comprises the steps of loading a representation of said input pattern into cells in an input layer; loading a representation of said memory pattern into cells in a memory layer; loading an initial value into cells in an intermediate layers between said input layer and said memory layer; comparing values of cells in said intermediate layers with values stored in cells of adjacent layers; updating values stored in cells in said intermediate layers based on said step of comparing; and mapping cells in said memory layer to cells in said input layer.

DETAILED DESCRIPTION

Figure 1:
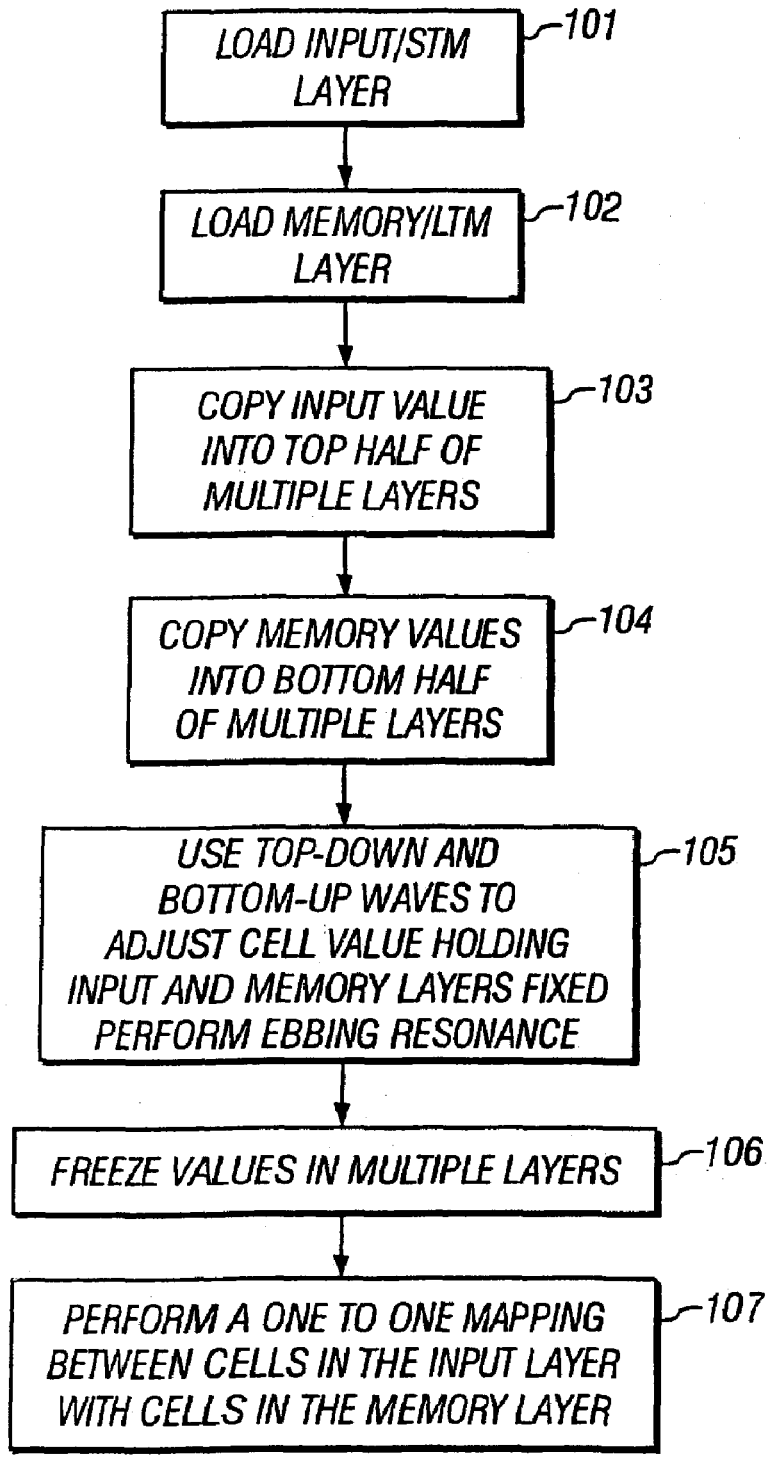
FIG. 1 shows a flow diagram of one embodiment of the transformation engine data processing of the present invention.

The following terms and their definitions are provided to assist in the understanding of the various embodiments of the present invention.

(1) Hierarchical Zooming as used in Multi-resolution Analysis and further explained in "Introduction to Wavelets and Wavelet Transforms", A Primer, C. Sidney Burrus, Ramesh A. Gopinath, Haitao Guo, Prentice Hall ISBN 0-13-489600-9 Chapter 2 page 10, A Multi-resolution Formulation of Wavelet Systems and "a Wavelet tour of signal processing"—Stephane Mallat ISBN 0-12-466606-X page 221.

(2) Ebbing resonance, Relaxation process as used in Simulated Annealing and further explained in Adaptive Cooperative Systems, Martin Beckerman, ISBN 0-471-01287-4, Chapter 7, page 253, The approach to equilibrium, 7.1.1 Relaxation and Equilibrium Fluctuations.

See also "Simulated Annealing" at Chapter 4, page 108. In connection with a transformation engine according to the present invention, simulated annealing results in a gradual reduction of the values of 'R' 'K' and 'a' over time.

(3) Intensity of Resonance means the value of the learning rate or update rate 0<R<1 such that if R is close to 1 then the "Resonance is Strong", and for 128 layers when R>0.955 then the Resonance is considered as "strong".

(4) Multi-level matrix refers to a transformation engine in which each cell/unit/pixel can hold more than one value at the time and in which these different values are used at different phases of the algorithm. For example, a one-dimensional transformation engine stores (x,y) values in its cells/units/pixels. An additional $(x_1,y_1)$ vector can also be stored.

(5) Euclidean distance (between (x,y,z) and $(x_1,y_1,z_1)$)= square root of $((x-x_1)^2+(y-y_1)+(z-z_1)^2)$.

(6) Far Differentials refer to Far Span k-Distance Connections such that, given 4 values of 4 pixels, p1,p2,q1,q2 such that p1,p2 are on one layer and q1,q2 are on an adjacent layer, let K be the distance between the p1 and p2 and the same distance between q1 and q2, then the Far Span k-Distance Connection between the 4 values is (p2−p1)−(q2−q1), such that the value p1 is in pixel $(i_1, j_1,S)$, the value p2 is in pixel $(i_2,j_2,S)$, the value q1 is in pixel $(i_3,j_3,S+1)$ and the value q2 is stored in pixel $(i_4,j_4, S+1)$. K means that the square root of $(i_1-i_2)^2+(j_1-j_2)_2$ is K and that also the square root of $(i_3-i_4)^2+(j_3-j_4)^2$ is also K. In a one dimensional transformation engine instead of having two indices (i, j) in each layer we have only one index.

(7) Energy, including the phrase "a more complex energy function", refer to a function minimized by a transformation engine according to an embodiment of the invention. The Energy function may be expressed by following integral in a two dimensional transformation engine, $$\int_x \int_y \int_z (\nabla P \cdot \nabla P + K(\nabla \nabla P \cdot \nabla P) \cdot (\nabla \nabla P \cdot \nabla P) + \text{Optional}) dx \cdot dy \cdot dz$$

given pixel (x,y) at layer z for a scalar energy P.

If each pixel holds a vector V instead of a scalar P then the gradient of P is replaced by the vector V and the second gradient of P is replaced by the gradient of V. Then the energy/Action integral takes the form, $$\int_x \int_y \int_z (V \cdot V + K(\nabla V \cdot V) \cdot (\nabla V \cdot V) + \text{Optional}) dx \cdot dy \cdot dz$$

The General Relativistic tensor form of the energy function may be expressed as:

$$\int_\Omega \left( P_{,m} P_{,k} g^{mk} + Kg^{Lk}\left(P_{,j} g^{jn}\left(P_{,k,n} - \begin{Bmatrix} u \\ kn \end{Bmatrix} P_{,u}\right)\right.\right.$$

$$\left.\left.\left(P_{,j} g^{jn}\left(P_{,L,n} - \begin{Bmatrix} u \\ Ln \end{Bmatrix} P_{,u}\right)\sqrt{-g}\right. d\Omega =\right.$$

$$\int_\Omega (P_{,m} P_{,}{}^m + KP_{,n} P_{,k} ;^n P_{,m} P_{,}{}^k; m\sqrt{-g}\, d\Omega$$

where $g_{km}$ is Einstein's metric tensor and the term $$\begin{Bmatrix} u \\ kn \end{Bmatrix}$$

is the Christoffel symbol. The General Relativistic energy function is a model of the cosmos as a transformation engine in equilibrium.

(8) Distance function is a function D that receives two points and calculates a value. For example the two points (x,y), $(x_1,y_1)$ and the functions $D((x, y),(x^1,y^1))=e^{(x-x_1)^2+(y-y_1)^2}$ or $D((x,y),(x_1,y_1))=\sqrt{(x-x_1)^2+(y-y_1)^2}$ (9) Radial basis decay function is a function g that is reduced with the distance from a given point $(x_0,y_0)$. For example $g(x,y)=e^{-(x-x_0)^2-(y-y_0)^2}$

(10) Convolution Scale is a convolution with a Radial basis decay function such that the distance from the point $x_0,y_0$ (refer to definition 9 above) is divided by a constant s terminal the scale factor:

$$g(x, y) = e^{\frac{-(x-x_0)^2-(y-y_0)^2}{s^2}}$$

This function is the same as in 9 but the distance $\sqrt{(x-x_1)^2+(y-y_1)^2}$ is divided by S. The square distance is divided by $S^2$.

(11) Pattern degeneracy, in connection with symmetry, if the derivative of a potential function p vanishes in a domain D then P is degenerated in D; and in connection with a multidimensional manifold, such as the 4 dimensional manifold (x,y,z,t,p(x,y,z,t)), wherein p depends on the other coordinates, one can consider the Gaussian curvature of the manifold, such that, if the curvature is 0 in the domain D, then the potential p is said to be degenerated on D. The last definition is appropriate only if x,y,z,t define and Euclidean space.

(12) Potential is a function that depends on coordinates and is a scalar value.

Scalar value means that the function calculates a directionless numeric value and not a vector. Thus, a generic potential is a function that calculates a value with no dimensions, such as the coulomb potential, 2 inches is a value with the dimension of length, $$p(x, y, z, t) = \frac{q}{\sqrt{(x-x_0)^2+(y-y_0)^2+(z-z_0)^2}}$$

(13) Hebbian learning and Hebbian learning rate means that, if a Unit(s,t) is updated towards a new data vector V then the new value of Unit(s,t) will be, (1−R) Units(s,t)+R·V such that R<1 where R is the Hebbian learning rate.

(14) Updates refer to an update of a value or vector v towards the value or vector u, the value r*(u−v) such that r is the resonance rate added to v, or v(n+1)=v(n)+r*(u(n)−v(n)).

(15) Resonance rate refers to the Hebbian rate at which a unit is updated towards a "winning" unit in an adjacent layer. The resonance rate 'r' or 'R' is a number between 0 and 1 not including 0 and 1, i.e., 0<r<1.

(16) Move Towards Winner refers to a competition, such that, suppose that n vectors $V_1, V_2, \ldots V_n$ are checked against a vector U to determine which is closest to U in Euclidean coordinates. Further, suppose that $|V_j-U|$ is the minimum norm for some 0<j<n=1. Then if the value r* $(V_j-U)$ such that 0<r<1 is added to U then U is said to Move Towards the Winner $V_j$.

(17) Winner Takes All refers to a competition, such that, suppose that n vectors $V_1, V_2, \ldots V_n$ are checked against a vector U which is closest to U in Euclidean coordinates. Further, suppose that $|V_j-U|$ is the minimum norm for some 0<j<n+1, then if the value r*(U−$V_j$) such that 0<r<1 is added to $V_j$ then Vj is said to be the Winner That Takes All.

(18) Ebbing Resonance refers to a relaxation process, wherein "relaxation" is used with the same meaning as in non-linear optimization theory. Relaxation typically involves a gradual reduction parameters such as heat, noise, peak to peak alternating current amplitude, speed, learning rate, electric field intensity, etc. The word "resonance" is used in the same way that it is used in ART (Adaptive Resonance Theory) as articulated by Professor Stephen Grossberg.

(19) Euclidean Distance is the distance between a vector V and a vector U that is the norm of the difference V−U in $R^n$, $$\|V - U\| = \sqrt{\sum_{i=1}^{n} (V_i - U_i)^2}$$

such that i is the index of the $i^{th}$ dimension of the vectors V and U.

(20) Far Differential refers to a Far Span K Distance Connection, such that the Far Differential−Far Span K Distance Connection between a Units(s,t) and Unit(s,t+k) is Unit(s,t+k)−Unit(s,t) and between Unit(s,t−k) and Unit(s,t) it is Unit(s,t−k)−Unit(s,t).

(21) Hexagonal Coordinates refers to a hexagonal matrix having the following indices, for an even row, 0, 2, 4, 8, . . . , 2n. For an odd row, 1, 3, 5, 7, . . . 2n+1. For example the following unit is valid Unit(s,30,30) and Unit(s,30,31) is invalid. Indices are used like the row and column indices in matrices in Linear Algebra.

(22) Hexagonal Neighbors (two-dimensional) defined such that the Hexagonal neighbors of the unit Unit(s,w,t) are Unit(s,w+1,t+1), Unit(s,w+1,t−1), Unit(s,w−1,t+1), Unit(s,w−1,t−1), Unit(s,w,t+2), Unit(s,w,t−2).

(23) Hexagonal Far Differentials refers to Far Span K Distance Connections (two-dimensional), such that for a valid unit Unit(s,w,t) there are 6 such Far Differentials as follows, Unit(s,w,t)−Unit(s,w+k,t+k), Unit(s,w,t)−Unit (s,w+k,t−k), Unit(s,w,t)−Unit(s,w−k,t+k), Unit(s,w,t)−Unit(s,w−k,t−k), Unit(s,w,t)−Unit(s,w,t+2k), Unit(s,w,t)−Unit(s,w,t−2k).

(24) 'k' Parameter is defined by Far Differential−Far Span K Distance Connection and Hexagonal Far Differentials−Far Span K Distance Connections.

(25) 'a' Parameter refers to a number that changes during the ebbing resonance numeric process. Instead of calculating the distance between the units U(s,t) and U(s,t−1) as |U(s,t)−U(s, t+1)| the distance function uses Far Differentials as follows, Distance(U(s,t), U(s+1,t+1))=|U(s, t)−U(s+1,t+1)|+ a*|U(s,t+k)−U(s,t)−U(s+1,t+1+k)+U(s+1,t+1)|+ a*|U(s,t−k)−U(s,t)−U(s+1,t+1−k)+U(s+1,t+1)|.

Distance(U(s,t), U(s+1,t−1))=|U(s, t)−U(s+1,t−1)|+ a*|U(s,t+k)−U(s,t)−U(s+1,t−1+k)+U(s+1,t−1)|+ a*|U(s,t−k)−U(s,t)−U(s+1,t−1−k)+U(s+1,t−1)|.

Distance(U(s,t), U(s+1,t))=|U(s,t)−U(s+1,t)|+a*|U(s,t+k)−U(s,t)−U(s+1,t+k)+U(s+1,t)|+a*|U(s,t−k)−U(s,t)−U(s+1,t−k)+U(s+1,t)|.

Using the Hexagonal Far Differential obtains a sum of 7 Euclidean terms in which six of them are multiplied by the 'a' parameter.

(26) Convolution (of a scalar or a vector function G which is defined on the domain D with a function f at the point X) is defined as, $$\text{Convolution}(G, X) = \int_D G(Z) * f(Z - X) \, dZ$$

(27) Hierarchical Zooming means an Ebbing Resonance process in which the 'k' parameter either in the one-dimensional numeric Transformatron or in the Two Dimensional Hexagonal Transformatron Far Differentials is gradually reduced. The term Hierarchical Zooming also refers to a convolution with Radial Basis Decay function such that the convolution integral takes the form, $$\text{Convolution}(G, X, t) = \int_D G(Z) * f\left(\frac{Z - X}{R(t)}\right) dZ$$

In this formula, R(t) is called Radial Scale and it is gradually reduced with the time t.

(28) Convolution Scaling refers to a function R(t) which is defined in the Hierarchical Zooming.

(29) Radial Basis refers to a function f(Z) is considered as a Radial Basis function if and only if f(Z)=u(|Z|) such that u is a function that depends only on the norm of Z.

(30) Radial Basis Decay refers to a function of the form, f(Z)=u(|Z|) and that the following conditions hold, $$\int_D f(Z) \, dZ < \infty \wedge (|Z| \to \infty) \Rightarrow f(Z) \to 0.$$

If the domain D is finite then the first condition holds.

(31) Clue Oriented Mapping [of two patterns f, g] is illustrated as follows. Let f and g denote bounded analytic real functions that are defined on open connected domains $D_f$ and $D_g$ such that there is a map F: $D_f \to D_g$, $\forall p \in D_f(p)$, Determinant(F)≠0 and F is globally onto and one to one. If the domains are finite sets in $R^n$ then we are done otherwise there is another requirement that the source of each compact set in $D_g$ should also be compact. This mapping F is called Proper in the mathematics (theory of Differential Topology).

We also require that $\forall p \in D_f(p), g(F(p))=f(p)$. A proper map that minimizes the following $\int C((K_{F(Z)}{}^t - K_z{}^t)^2)_{dz}$ such that K is the Gaussian Curvature of the manifolds $D_f$,f and $D_g$,g respectvely is defined Clue Oriented. C is a function that defines how the system responds to curvature mismatches. Example for C is C(x)=log(1+k).

(32) Degenerated Pattern refers to pattern degeneracy, wherein a degeneration pattern is a function f that is defined on a domain $D_f$ such that there exists an open set Q such that the Gaussian curvature K of the manifold $D_f$,f on Q is 0.

(33) Degree of Freedom refers to a condition in which more than one possible solution can be reached.

(34) Phase Lag refers to the time from the moment a particle is placed in an electric field until it gains most of its induced dipole, say 0.9 of the final dipole.

One embodiment of present invention provides a "transformation engine" that incorporates a Gestalt approach to image comparisons, pattern recognition and image analysis. The present invention may be used to create a point-to-point mapping or a point-to-point map between an input pattern and a stored pattern (for convenience of explanation together referred to as two visual objects although applicable to other data having or representative of a pattern). This point-to-point mapping may be implemented by performing a transformation between the two visual objects and creating a multi-layered gradual transition between the input pattern and the stored or memory pattern. The point-to-point mapping is performed by Resonance as defined hereinabove. Thus, Resonance is used to construct a transformation between the two visual objects using a multi-layered gradual transition. This multi-layered entity according to one embodiment of the invention constitutes a matrix formed of a plurality of layers. Each layer, within the multi-layered approach, maintains the topological features of each of the two visual objects. That is, intermediate layers maintain and exhibit characteristics common to the two visual objects such that significant features of the pattern are recognizable. As the number of layers increases, the difference between two adjacent layers is reduced. While this embodiment of the present invention does not explicitly minimize the global "energy" function, the embodiment may achieve a Gestaltist energy minimization of a transformation between the two visual objects.

Energy minimization is a consequence of the structure of the transformation engine of the embodiment. Energy minimization may be effected by an information "smearing" procedure, which causes a migration of data through the matrix to achieve a minimized energy potential between layers. Transitions between layers may be created by providing "waves" of modifying functions. Two waves, a top down wave and a bottom up wave, may be used to create a Gestalt transformation between the two visual objects. The input pattern may be stored in the input layer or the short term memory (STM) layer and the stored "reference" or "target" pattern may be stored in the memory layer or the long term memory (LTM) layer. The transformation engine of the present invention achieves the point-to-point mapping between the two visual objects without either directly or indirectly calculating statistical values. Once the point-to-point association between the two visual objects is achieved, stable statistical measurements may be calculated to determine the amount of agreement between the two visual objects. This embodiment of the present invention may be used for comparing patterns of visual objects (a comparison mode) and for isolating an object from the surrounding background or other objects (selective attention task).

The transformation engine of the present invention includes or operates in two phases. In the first phase the transformation engine builds a map between the LTM (referenced or target image) pattern and the STM (input pattern under examination) pattern. In the second phase, the transformation engine uses "vibration" waves to turn the map created into either an explicit point-to-point mapping or into an explicit pattern recognition engine. The vibration waves cause the intermediate layers to maintain a low energy state while encouraging conformance to LTM and STM patterns based on distance from such.

The map created by the transformation engine may be created in a number of ways, each of which is included in the present invention. In one embodiment the map may be created by digital means, e.g., a digital computer. In another embodiment the map may be created by physical means, i.e., incorporating a media responsive to patterned conditions so as to provide a transition between patterns, such as by placing elongated pieces of conducting material within an electric field such that the conducting material becomes aligned within the electric field. Other means of creating the mapping from the LTM pattern to the STM pattern are also included within the present invention.

During the second phase of operation of the transformation engine, vibration waves cause the intermediate values in the intermediate layers—between the LTM and the STM layers to oscillate which prevents the transformation engine from permanently storing local minimum of the corresponding Action Integral within the intermediate layers. In other words, the transformation engine is aimed at eliminating the Variation of the (static) Action Integral:

$$0 = \delta \int_x \int_y \int_z (\nabla P \cdot \nabla P + K(\nabla \nabla P \cdot \nabla P) \cdot (\nabla \nabla P \cdot \nabla P) + \text{Optional}) dx \cdot dy \cdot dz$$

Where LTM=P(X,Y,0) and STM=P(X,Y,1).

The elimination of the variation of the Action Integral means that the potential p maintains up to second order derivatives as the pattern that is encoded by p changes from one layer to the next adjacent layer. Convergence in a digital implementation where neither a real potential nor its gradient (the induced vector field) may be achieved through digital means, i.e., by use of a digital representation of the vector field using for example, a mathematical model to be explained below. In a preferred embodiment, the transformation engine forces values to change in the intermediate layers through the use of a learning rate (R) that is typical to concurrent neural networks approach. In this embodiment, if P(S) represents the value stored in an intermediate layer, and it is desired to change P(S) into a new value W then the learning rate 0<R<1 defines the learning paradigm, $P_{new}(S) = (1-R)*P_{old}(S)+R*W$. If R is close to 1 then the learning process is rapid but relatively unstable. The reduction of this parameter from 0.995 to 0.835 with the number of layers is 128 along with the reduction of the Far Span k-Distance Connections (a) is a way to minimize the Action Integral. In a "real" physical system, i.e., one relying on some physical property of a component of the system, neither the learning rate nor the Far Span K-Distance Connection would be necessary.

A digital implementation of the comparison mode of the present invention will be described first.

FIG. 1 shows a flow diagram of one embodiment of a transformation engine data processing of the present invention. In Step 101 an input pattern is loaded into the input layer or "short term memory" (STM) layer. Note that the input or STM layer may be represented by or stored in either the top most layer of the matrix or the bottom most layer of the matrix. For ease of explanation, the input layer will be defined as the top most layer of the matrix. In Step 102 the memory pattern is loaded into the memory layer or long term memory (LTM) layer. The memory or LTM layer may also be the bottom-most layer or the top-most layer opposite the STM layer. That is, the memory layer should be at the opposite end of the matrix from the input layer. For ease of explanation, the memory layer will be defined as the bottom most layer of the matrix.

In Step 103 data values representing some pattern to be identified (e.g., an input image) are stored in the input layer and copied into each level of the top or upper half of the multiple layers. Similarly, in Step 104 data values representing some previously stored pattern are stored in the memory layer and copied into each level of the lower or bottom half of the matrix. Steps 103 and 104 provide the cells of the inner layers of the matrix with initial data values to initialize the matrix. In Step 105 a top-down "wave" and a bottom-up :wave: are promulgated through the multi-layer matrix as further described below. When Step 105 is performed during a comparison mode, the values in the input layer and the memory layer are held constant, but the initial values stored in each of the inner layers of the matrix may be adjusted to provide a gradual transition of pattern data between layers. During this step the "intensity" of the waves is gradually reduced, i.e., the magnitude of change between layers is gradually reduced, as is the span of data checked as the method progresses towards convergence and energy minimization. This reduction in the intensity of the waves occurs in the first phase of the transformation engine when a map is constructed between the LTM and the STM pattern. Ebbing Resonance is also performed in Step 105 as further described below. The values in each of the layers are held constant in Step 106 and a one-to-one mapping is performed in Step 107 between the input layer and the memory layer.

Various methodologies may be used to perform this one-to-one mapping including sequentially sending a single wave for each input cell and determining, based on the single wave, the best matching memory cell. In this case, for each pixel of the STM input board/layer represented by (i, j) the value of the pixel (i,j) is oscillated or varied over a predefined range while the value for all other pixels (i.e., data elements of the pattern) of the STM board are held constant. This process is repeated serially for each one of the pixels of the STM board. The best matching memory cell using this methodology is the memory cell which receives the strongest vibration wave from the single wave applied to the input cell. Once the best matching memory cell is identified, the corresponding input cell is mapped to the memory cell. Alternatively, a coherent vibration wave may be sent from all of the cells in the input layer and spectral analysis of the wave may be performed to determine the associations between input cells and memory cells. This second methodology creates a vibration wave pattern in each of the memory cells which is a superposition of small ripple vibration waves. By measuring and performing spectral deconstruction on the resulting pattern in the memory layer, a Bayesian pattern may be identified.

Figures 2, 4:
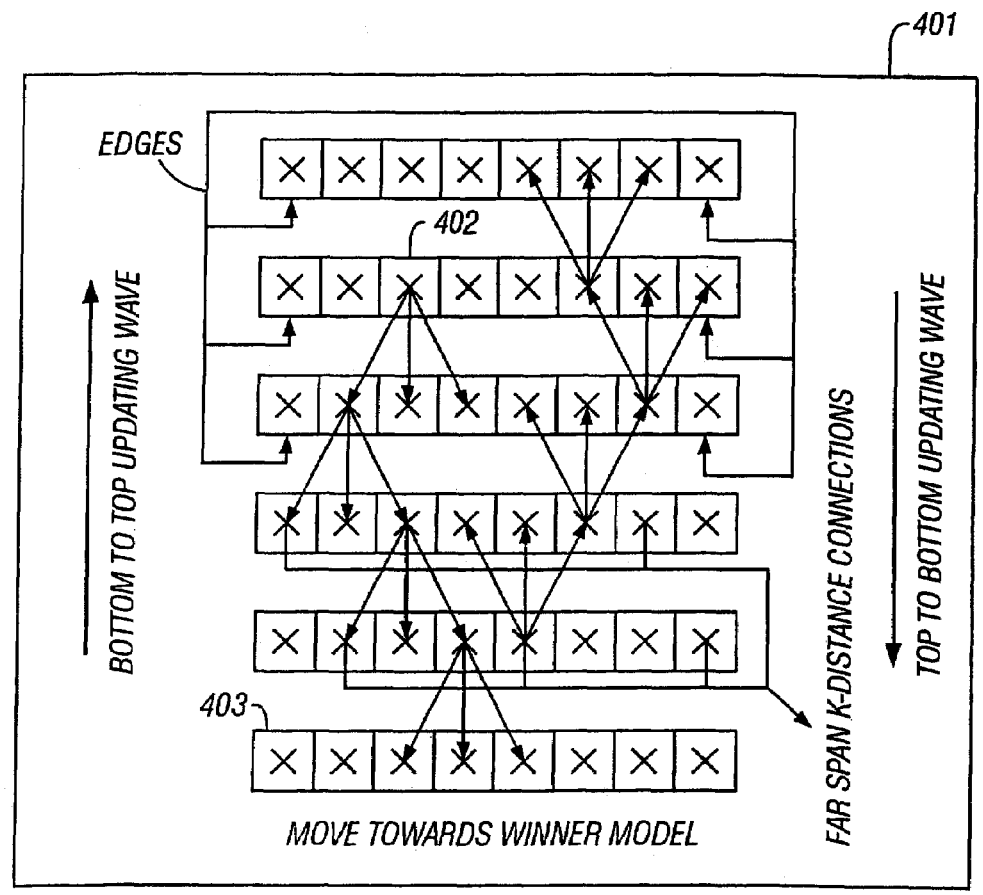
FIG. 2 shows an embodiment of the present invention including a one dimensional numeric transformation engine which may be used to map time dependent curves.
FIG. 4 shows the structure of a one-dimensional numerical transformation engine including a top-down and bottom-up wave propagation approach of one embodiment of the present invention.
Figure 3A:
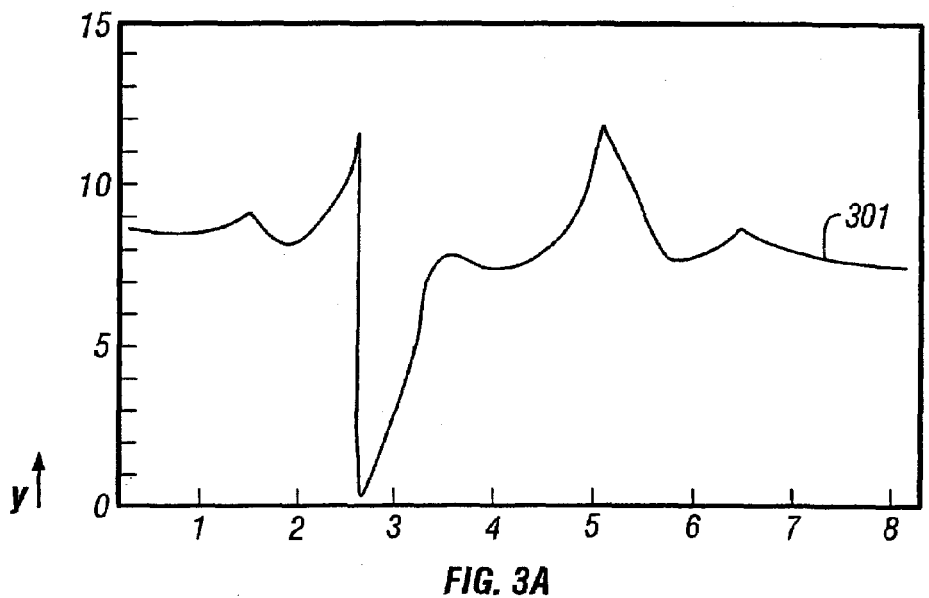
FIG. 3A is a one dimensional, time dependent curve representing an input pattern.
Figure 3B:
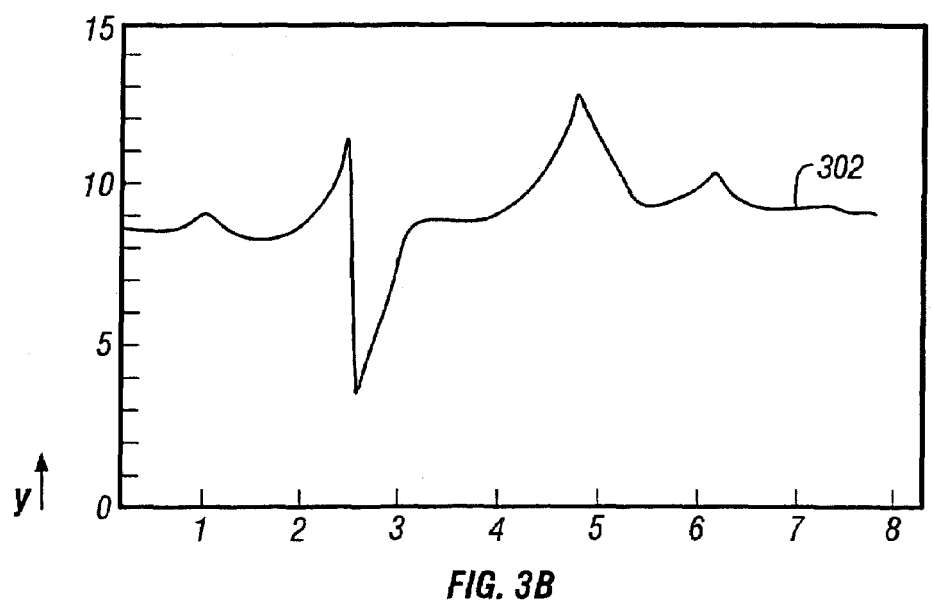
FIG. 3B is a one dimensional, time dependent curve representing a memory pattern.
Figure 3C:
FIG. 3C shows the one dimensional, time dependent curves representing superimposed input and memory patterns.

FIG. 2 shows an embodiment of the present invention which includes a one dimensional numeric transformation engine which may be used to map time dependent curves. FIG. 3A is a one dimensional, time dependent curve which is represented by input pattern 301. FIG. 3B is a one dimensional, time dependent curve which is represented by memory pattern 302. As discussed in connection with Step 101, initially, data representing the input signal curve is loaded into the input layer 201, which is represented by the "y" coordinates (e.g., sampling points or times) from FIG. 3A which are thereby contained within layer 201. Preprocessing may also be performed on the values prior to storage in input layer 201. The memory curve is loaded into memory layer 202 as discussed in connection with Step 102 and as shown in layer 202 of FIG. 2. The "y" coordinates from FIG. 3B are contained in layer 202. Preprocessing may also be performed on the values before they are stored within memory layer 202. Initially, each of the cells of layers 203 and 204 contain the same values in each of the respective cells of the layers as layer 201 as shown in FIG. 2 and as described in Step 103. Similarly, as shown in layers 205 and 206, the "y" coordinates from the cells in memory layer 202 are copied into the respective cells for layers 205 and 206 and as described in Step 104. FIG. 3C shows the one dimensional, time dependent curves which represent input pattern 301 and memory pattern 302 superimposed. As can be seen, while the general form of the two patterns or signals are similar, each differs from the other in specifics.

Once each layer of the matrix stores initial values, Step 105 is performed and both top-down and bottom-up waves are passed alternately through the matrix. The top-down and bottom-up waves may modify the values stored in each of the cells to form a mapping between layers. (Note that, in a comparison mode, the values in the cells in the input layer and the memory layer remain constant through the comparison.) Also in Step 105, an ebbing resonance process is applied to the multi-level matrix. The ebbing resonance process is a relaxation process that achieves convergence via hierarchical zooming. In a preferred embodiment, both the intensity of the resonance and the radius at which differences between a cell and its neighboring cells are checked and gradually reduced. The complete ebbing resonance uses convolutions and time varying patterns in a top-down and a bottom up approach alternately. The convolutions, as described more fully below, are instrumental in overcoming energy pits and process degeneration around, for example, local minimum.

Figure 3D:
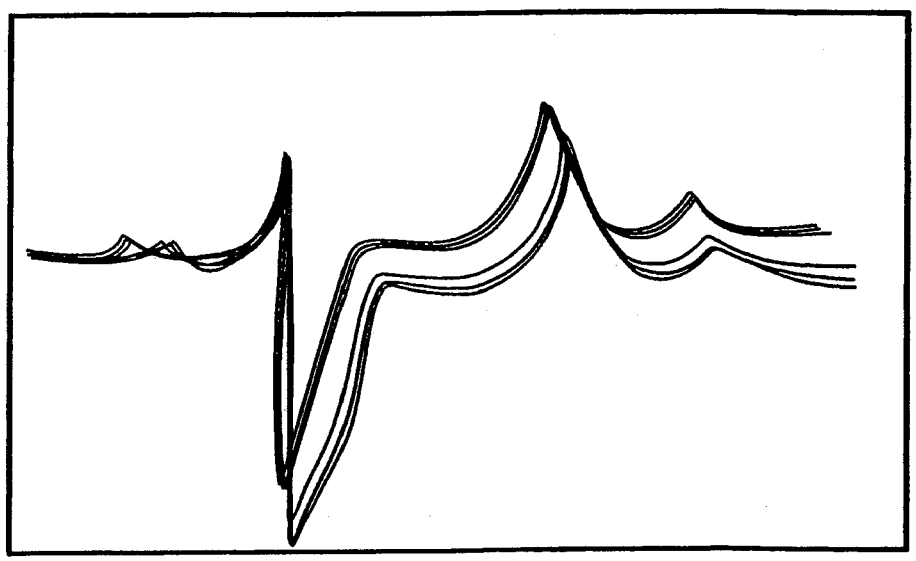
FIG. 3D shows the one dimensional, time dependent curves representing the layers within a matrix during the early stages of top-down and bottom-up wave traversal.
Figure 3E:
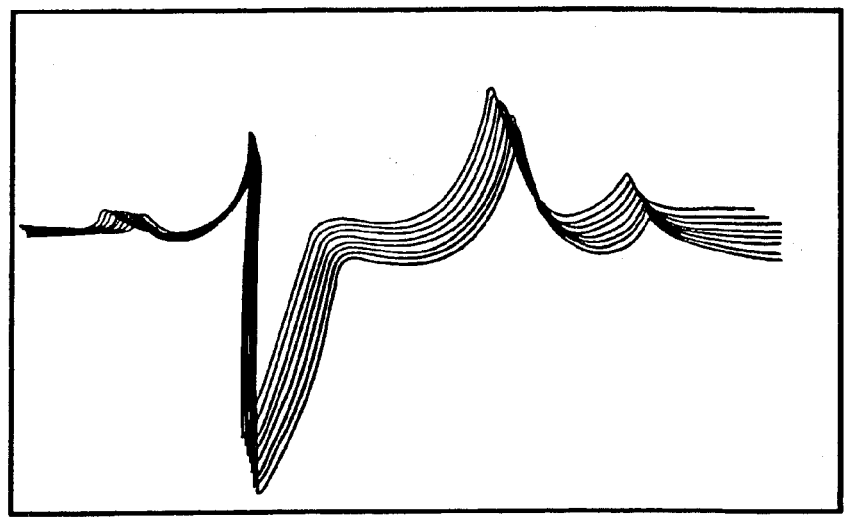
FIG. 3E shows the one dimensional, time dependent curves representing an advanced stage top-down and bottom-up wave traversal.

FIGS. 3D and 3E illustrate data stored in intermediate layers as the method progresses toward a possible mapping, the intermediate layers providing fiber resolution as each series of waves are propagated and convergence is achieved.

FIG. 4 shows the structure of a one-dimensional numerical transformation engine of one embodiment of the present invention. transformation engine 401 of FIG. 4 may hold the value of (x,y) representing discrete sample points of a time dependent curve by storing "x" amplitude value in array at index value "y" representative of sampling time. As previously described, in Step 105 two waves are present a top-down wave and a bottom-up wave. In a preferred embodiment, the top-down wave and the bottom-up wave operate alternatively on the multi-level matrix to transform the data stored in the intermediate matrices toward a minimum energy convergence. For ease of explanation, the operation of the top-down wave and the bottom-up wave will be explained independently, and then an explanation will be given as to how these two waves work together to adjust the values of the cells contained within the inner layers of the multi-layer matrix. Also for ease of explanation, comparisons between the layers in FIG. 4 will use terms such as layer above and layer below, referring to the positional orientation of the layers in FIG. 4 as illustrated as horizontal rows of the matrix. For this explanation an adjacent layer below is defined to be, with respect to FIG. 4, a layer which is positioned immediately below the current layer with no intermediate layer. Similarly, for this explanation, an adjacent layer above is defined to be, again with respect to FIG. 4, a layer which is positioned immediately above the current layer. Values within cells may also change during Step 105 from a present value to a future value.

At the completion of Step 104 the present value of each cell is equal to the initial cell value as described previously, i.e., to the value stored in the closest top and bottom layer. Additionally, the determination of the future value of a cell is dependent on the position of the cell within the layer. For interior cells, those cells which are not positioned at the start or the end of the layer, the future value of the cell is dependent on a number of cells, e.g., three other cells contained in nearly positions of the adjacent row according to a one dimensional transformation engine as described below. For end cells, those cells in the first or last position of a layer, the future value of the cell is dependent on one other cell in a one dimensional transformation engine as described below. Note that the dependency of a cell on three other cells represents one embodiment of the present invention and that other dependencies are within the scope of the present invention.

For the bottom-up wave, the future value of an interior cell is determined by checking the present value in three closest cells in the adjacent layer above. In one embodiment of the present invention, when the multi-level matrix is operating in a comparative mode, the values of the top most row (the input layer) are not adjusted and continue to contain values representing the input pattern. Processing of the bottom-up wave therefore begins in the second layer. For each interior (i.e., non-end) cell in the second layer, the three closest cells in the first layer are examined to determine the cell in the first layer which has the value closest to the current value of the cell in the second layer. If "t" represents the cell index/location within a layer, and "s" represents the layer, Unit (s, t) may be used to represent the cell (or unit) in layer "s" in position "t". Using this convention, the reference for cell 402 in FIG. 4 would be Unit (2, 3). This convention is based on the layers being numbered from 1 to 6 from top to bottom and the cells being numbered from 1 to 8 from left to right of FIG. 4. In general, for the bottom-up wave, each unit (s, t) examines unit (s−1, t−1), unit (s−1, t) and unit (s−1, t+1). For each of these units, a unit containing a value of x and y which is closest to the present values of x and y in Euclidean distance is identified. Note that the Euclidean distance between a vector V and a vector U is calculated as follows:

$$\text{between two points } p \text{ and } q = \sqrt{\sum_{i=1}^{N} (p_i - q_i)^2}$$

In the bottom-up wave, once the value for each cell in a layer has been determined using the three cells in the adjacent layer above, the values for the cells of the adjacent layer below are calculated. In other words, for the bottom-up wave, once the values for the cells in layer 2 are determined using the values of the cells in layer 1, the value for the cells in layer 3 are determined using the values of the cells in layer 2. This process continues until the values stored in the cells of layer 4, are used to update the values of the cells in the next to the bottom layer (layer 5 in FIG. 4).

The top-down wave operates similarly. For the top-down wave, the future value of the cell is determined by examining the three closest cells in the adjacent layer below. In one embodiment of the present invention when in comparison mode, the values of the lowest-most row (the memory layer) are not adjusted and continue to contain values representing the memory pattern. The top-down wave therefore begins in the second from the bottom layer (layer 5 of FIG. 4). For each cell in layer 5, the three closest cells in layer 6 (the layer immediately below layer 5) are analyzed to determine the value in the cell which has the value closest to the current value of the cell in the layer 5. In general, for the top-down wave, each unit (s, t) checks unit (s+1, t−1), unit (s+1, t) and unit (s+1, t+1). For each of these units, a determination is made as to which of the units contains a value of x and y which is closest to the present values of x and y in the same manner as previously described. In the top-down wave, once the value for each cell in a layer has been determined using the adjacent layer below, the values for the cells of the adjacent layer above are calculated. In other words, for the top-down wave, once the values for the cells in layer 5 are determined using the values of the cells in the memory layer (layer 6), the value for the cells in layer 4 are determined using the values of the cells in layer 5. This process continues until the values stored in the cells of the layer 3 are used to update the values of the cells in layer 2.

As described, the bottom-up wave travels from the layer below the input layer (or the second layer in FIG. 4) to the layer above the memory layer (or the fifth layer of FIG. 4). Similarly, the top-down wave travels from the layer above the memory layer (the fifth layer of FIG. 4) to the layer below the input layer (the second layer of FIG. 4). As described, both the bottom-up and the top-down waves will pass through the middle layers of the multi-layer structure. In a preferred embodiment, the bottom-up and top-down waves are applied to middle layers alternatively. For example:

A) A bottom-up wave is applied to layer 2. During this application of the bottom-up wave, values in layer 2 will be updated using values in layer 1.

B) After the bottom-up wave is applied to each cell in layer 2, a top-down wave will be applied to layer 5. During this application of the top-down wave, values in layer 5 will be updated using values in layer 6.

C) After the top-down wave is applied to each cell in layer 5, the bottom-up wave is applied to layer 3. During this application of the bottom-up wave, values in layer 3 will be updated using values in layer 2.

D) After the bottom-up wave is applied to each cell in layer 3, the top-down wave will be applied to layer 4. During this application of the top-down wave, values in layer 4 will be updated using values in layer 5.

E) After the top-down wave is applied to each cell in layer 4, the bottom-up wave will be applied to layer 4. During this application of the bottom-up wave, values in layer 4 will be update using values in layer 3.

F) After the bottom-up wave is applied to each cell in layer 4, the top-down wave will be applied to layer 3. During this application of the top-down wave, values in layer 3 will be update using values in layer 4.

G) After the top-down wave is applied to each cell in layer 3, the bottom-up wave will be applied to layer 5. During this application of the bottom-up wave, values in layer 5 will be updated using values in layer 4.

H) After the bottom-up wave is applied to each cell in layer 5, the top-down wave will be applied to layer 2. During this application of the top-down wave, values in layer 2 will be update using values in layer 3.

This alternating process completes one application of the bottom-up and top-down waves in the 6 row matrix of the present example. Note that bottom-up and the top-down waves must reach the middle layers in intermittent order. If there are n=2m layers then in one cycle the bottom-up wave reaches layer m first and only then does the top-down wave reach the m−1 layer. In the following cycle the top-down wave reaches the m−1 layer first and only then does the bottom-up wave reach the m layer.

As described, each interior cell or unit is compared to three other cells or units in either a layer above (for the bottom-up wave) or a layer below (for the top-down wave). Thus, the cell is compared to the t−1, t and t+1 cells in the corresponding layer. For end cells either the t−1 or the t+1 cell is unavailable. For the t=1 cells, the t−1 cell in the layer above or below is unavailable and for the t=maximum (t=8 in FIG. 4) the t+1 cell in the layer above or below is unavailable. In these circumstances, a different method of updating the value of the end cell is required. In these instances the Far Differentials–Far Span K Distance–span connections cannot be used either. For the end cells, Unit (s, 1) or Unit (s, m) in the bottom-up wave the cell value is set equal to the value of Unit (s+1, 1) or (s+1, m) respectively. For the end cells, Unit (s, 1) or Unit (s, m) in the top-down wave the cell value is set equal to the value of Unit (s−1, 1) or (s−1, m) respectively.

Note that using simple Euclidean distance for updating Unit (s, t) cannot guarantee convergence to a global minima of the sum of square distances. A more efficient method of achieving the global minimum is by use of a Far Differential–Far Span K Distance Connection. The Far Differential–Far Span K Distance Connection describes the metrics necessary to achieve a global minimum. This procedure minimizes a more complex energy or distance function in order to implement complex visual comparison tasks. The Far Differential–Far Span K Distance Connection between Unit (s, t) and Unit (s, t+k) is Unit (s, t+k)−Unit (s, t). Similarly, the Far Differential–Far Span K Distance Connection between Unit (s, t−k) and Unit (s, t) is Unit (s, t−k)−Unit (s, t).

FIG. 3D shows the one dimensional, time dependent curves which represent the layers within the matrix during the early stages of the application of the top-down and bottom-up waves. Similarly, FIG. 3E shows the one dimensional, time dependent curves which represent an advanced stage of the application of the top-down and bottom-up waves.

There is a gradual reduction in the intensity of the changes in the values stored in the cells during the application of the top-down and bottom-up waves and an ebbing resonance stage is reached. Ebbing Resonance is a relaxation process. The word "relaxation" as used herein has the same meaning as in non-linear optimization theory. Here, relaxation is accomplished by gradually reducing the Far Span K Distance Connections. While this reduction alone is insufficient to guarantee convergence, it provides additional stability to the procedure. In order to guarantee convergence using a full numeric solution, a power of logarithmic Radial Basic Decay function is used in a Hierarchical Zooming convolution and is applied to the input/STM layer and the memory/LTM layer simultaneously. In addition, the Convolution scale is also gradually reduced.

The Far Span K Distance Connections modifies the Euclidean distance that is used by the top-down and bottom-up waves. For example, application for Far Span K Distance Connections causes the Euclidean distance $|U(s,i)-U(s,i+1)|$ to become Distance$(U(s,i+1))=|U(s,i)-U(s+1,i+1)|+a*|U(s, i+k)-U(s,i)-U(s+1, i+1+k)+U(s+1, i+1)+a*|U(s, i-k)-U(s,$ i)−U(s+1, i+1−k)+U(s+1, i+1)|. During the ebbing resonance, the real number "a" is also gradually reduced with "k" and with the radius of the Hierarchical Zooming convolution. If a convolution tool is not available and the values in the cells or units are kept constant during the Ebbing Resonance, convergence may still be obtained by the use of a very high Resonance rate (0.995 for 128 layers) and gradually reducing the resonance rate, the "k" parameter and the "a" parameter. This procedure allows the resonance rate to be gradually reduced during Hierarchical Zooming.

Once the Ebbing Resonance process has been completed, update waves may be used to carry information between the layers of the matrix. For example, an update wave may be used to propagate index related information from the input layer, through each of the intermediate layers to the memory layer to create a point-to-point mapping between cells in the input layer and cells in the memory layer. Top-down and bottom-up update waves may be applied to the matrix to determine point-to-point mappings. In a one-dimensional transformation engine, each unit or cell checks three units in an adjacent layer (the layer above for bottom-up and the layer below for the top-down). One of the three units in the adjacent layer holds a value of x, y which is closest to the values of x, y of the current unit in Euclidean distance. An intrinsic index, which represents the unit in the adjacent cell which had the closest value, is then stored in the current unit. This process is repeated for each cell in the layer, and for each layer in the matrix. After each cell of each layer has been examined and an intrinsic index has been stored, the intrinsic index propagates from the input layer to the memory layer and vice versa.

The final mapping is influenced by the number of layers contained in the matrix and the pattern degeneracy. Here a degenerated pattern is a function f that is defined on a domain $D_f$ such that there exists an open set Q such that the Gaussian curvature K of the manifold $D_f$ on Q is 0.

Figure 5:
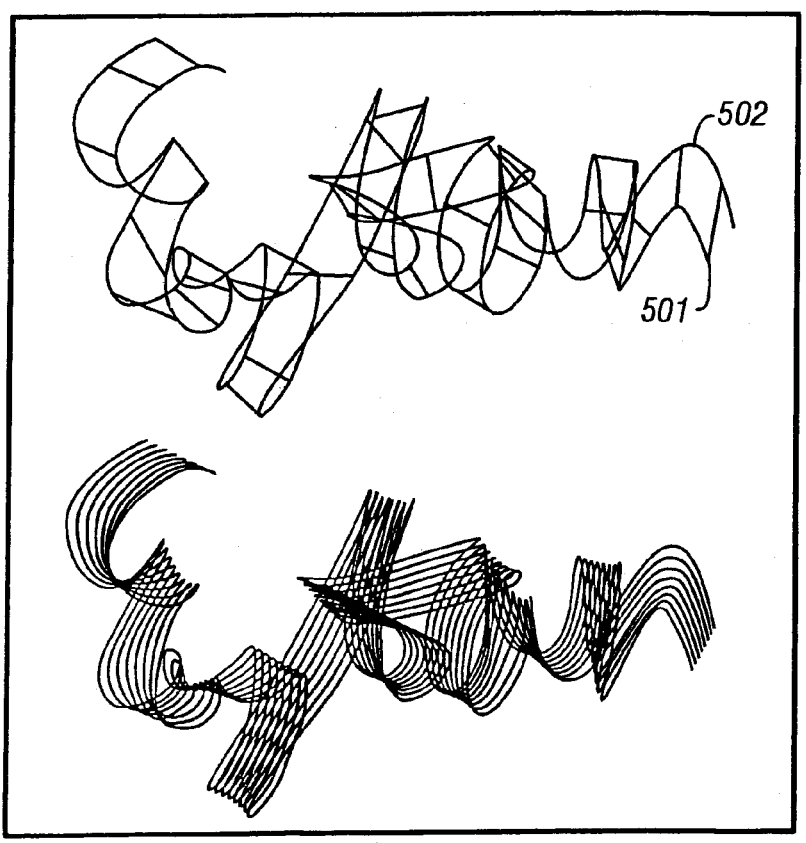
FIG. 5 shows a screen shot of a mapping between a stored signature and input signature with corresponding points connected by line segments.

FIG. 5 shows a mapping between a stored signature 501 and input signature 502 with corresponding points connected by line segments. The bottom signatures include intermediate layer information. Note that reflex points are maintained without a requirement for their independent identification.

Figure 6:
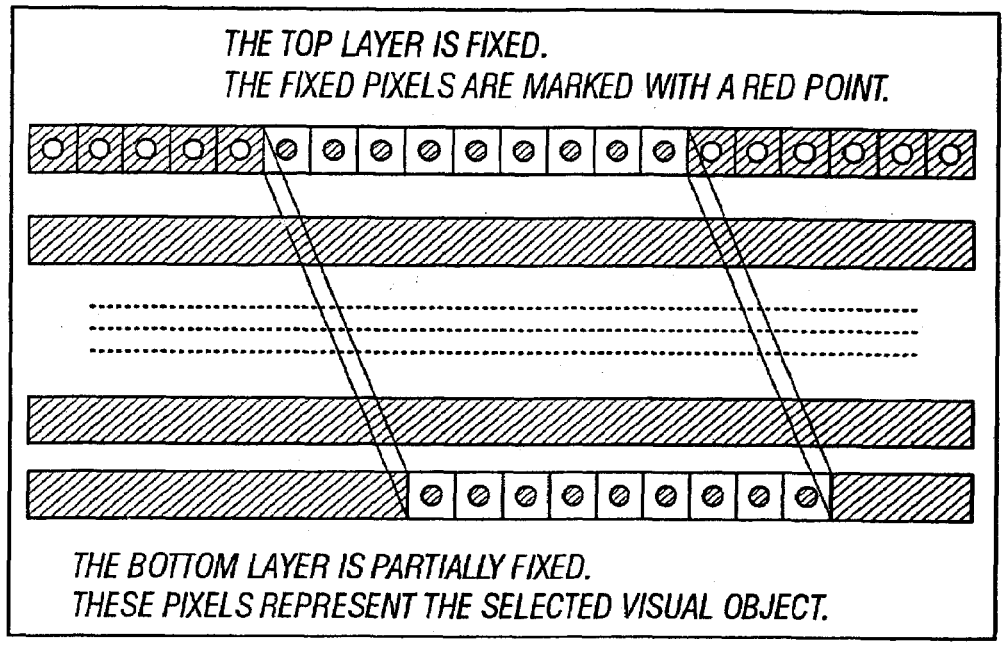
FIG. 6 represents another embodiment of the present invention which may be used to implement selective attention filtering of noise.

FIG. 6 represents another embodiment of the present invention which may be used to perform selective attention so as to identify a predetermined object in amongst other objects and/or a noisy environment. In an image context, as previously described, selective attention includes the ability to isolate a visual object from a background or other objects. In the comparative mode of the present invention described previously, the values stored in the cells of the input layer and the values stored in the cells of the memory layer are held constant. To perform selective attention the cells which represent the background portion of the image or pattern stored in the memory layer are allowed to converge to any value as required.

In performing Selective Attention the background pixels of an image that are stored in the LTM memory layer are "turned loose." They can converge to any value. This requires that the Convolution that is used in the Hierarchical Zooming process that is part of the Ebbing Resonance must be redefined.

Referring to FIG. 6, if the two input/STM and memory/LTM patterns are a two dimensional encoding of the edges of an image. An image can be encoded on a pixel board using a physical phenomena such as electric fields. If two additional layers are added, one prior to the input layer and one after the memory layer, then the distance between the pre-input layer and the input/STM layer serves for "blurring the image." A relaxation can be achieved by gradually decreasing the distance between the pre-input and the input layer. The same is done with the memory layer. The distance between the memory layer and the post-memory layer is gradually decreased, the result is that both the input and the memory patterns gradually become clearer. Now the pre-input and post memory/LTM layers are held constant instead of the original input/STM and memory/LTM layers. The desired behavior of the system can be mathematically shown, the electric field potential depending on l/R where R is the distance from the electric charge. Thus, as the distance r between the memory/LTM and the post memory/LTM board grows, the potential difference between two points on the post memory/LTM board as seen on the memory/LTM board as, $$\text{Potential difference} = \frac{q_1}{\sqrt{r^2 + d_1^2}} - \frac{q_2}{\sqrt{r^2 + d_2^2}}$$

such that $q_1$ and $q_2$ are the charges of $pixel_1$ and $pixel_2$ respectively and $d_1$ and $d_2$ are the "horizontal" distance from the interacting point on the memory/LTM board. As r increases, the influence of $d_1$ and $d_2$ is reduced and the image on the memory board becomes blurred. The loose cells in this case are on the post memory layer.

Note that while the examples used to explain the invention used a matrix containing 6 layers with each layer including eight cells or units, the present invention may include a matrix with any number of layers with each layer containing any number of cells. As the number of layers increases the granularity of the process is reduced such that difference in values stored from one cell to an adjacent cell is minimized.

Note also that while the examples used to describe the present invention were limited to a one-dimensional numeric transformation engine, other embodiments exist, including multi-dimensional matrices and data spaces that are within the present invention.

The embodiments of the present invention described thus far incorporate a digital means to produce the metamorphosis of the patterns from the LTM pattern to the STM pattern. Instead of using digital numeric calculations another embodiment of the present invention uses electric fields to accomplish the time varying convolutions and the vibration waves used to complete the gradual metamorphosis. In this physical embodiment, the units that constitute the layers between the input/STM layer and the memory/LTM layer may be either passive (for example induced or constant dipoles) or active (for example CMOS components). In either case, the units that constitute the intermediate layers cannot be fixed in space. If passive units constitute the intermediate layers, these passive units cannot be spherical in shape, but must provide some form of asymmetry with respect to a desired physical characteristic, e.g., electric change (dipole), magnetic orientation (North/South); etc. One requirement of the passive units is that they be able to point in any direction, i.e., free to orient in a position under influence of a field.

The resonance and the update waves, the "reduction of the intensity of the waves" (The Simulated Annealing) and the Far Span k-Distance connections (Far Differentials) described thus far employ a numeric, digitally implemented means of achieving a gradual metamorphosis between the input STM pattern and the memory LTM pattern such that in every intermediate pattern the Topology (Shape) is preserved. That is, manipulation of data patters products a numeric representation of the metamorphasic.

In the digital means of achieving a transformation engine and other strongly cooperative systems, local coupling of degrees of freedom lead to scaling phenomena through a cascade effect which propagates throughout the entire system. The transformation engine approach generates new potentials (known as Hamiltonians) from older potentials by incrementally removing degrees of freedom during each iteration. At the completion of each iteration a Hamiltonian representing unchanged length scale interaction remains.

The present invention also includes a physical transformation engine which includes mixed terms in corresponding Hamiltonian. In this case, it is unnecessary to progressively integrate-out degrees of freedom by the use of Ebbing Resonance and For Spin K-distance connection.

Figure 7:
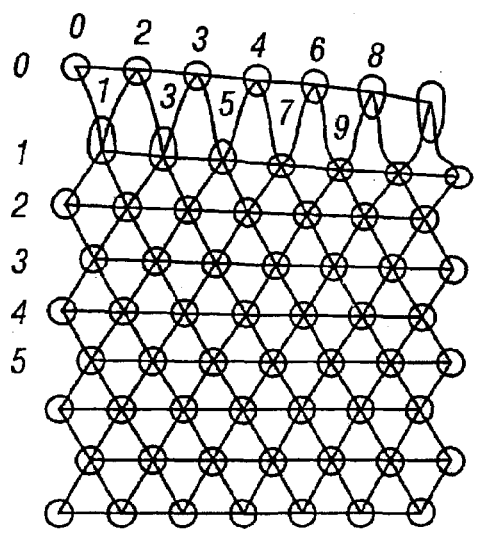
FIG. 7 shows a two-dimensional hexagonal implementation of a transformation engine according to an embodiment of the invention.

FIG. 7 shows a dimensional hexagonal implementation of a transformation engine according to an embodiment of the invention. A cell or unit in a two dimensional numeric transformation engine can be generally represented by Unit (s, t, w) where "s" represents the layer and "t, w" represent the coordinates of the unit within the layer. In the two-dimensional transformation engine unit (s, t, w) now interacts with seven units in layer s+1 and seven unit in layer s−1. Unit (s, t, w) "examines" (i.e., the following nearby units are examined in formulating an updated value to store into unit (s,t,w)) unit (s+1, t+1, w+1), unit (s+1, t+1, w−1), unit (s+1, t−1, w+1), unit (s+1, t−1, w−1), unit (s+1, t, w+2), unit (s+1, t, w−2) and unit (s+1, t, w). Unit (s, t, w) also interacts with seven units in layer s−1 namely: unit (s−1, t+1, w+1), unit (s−1, t+1, w−1), unit (s−1, t−1, w+1), unit (s−1, t−1, w−1), unit (s−1, t, w+2), unit (s−1, t, w−2) and unit (s−1, t, w).

The transformation engine may be described by using the idea of Minimization of an Action Integral and Calculus of Variations in order to describe a potential p (scalar function p(x, y, z, t)) that preserves the geometric properties of itself as it changes from the input STM pattern to the memory LTM pattern. Note that a single potential is insufficient in order to generate realworld metamorphosis between patterns. Also note that a physical transformation engine should work on two-dimensional patterns of Grey Scale patterns.

The minimization of an Action Integral may be used to derive Einstein's Gravity equations and the Quantum Mechanics equations. As further described below, the transformation engine may be described in terms of an Action Integral. Additionally, the Action Integral of the transformation engine may be written in Tensor form and may have applications in String Theory.

Both Far Span k-Distance Connections and the Ebbing Resonance process are redundant in a physical implementation of a transformation engine consistent with the invention. A hardware transformation engine is capable of performance beyond the Turing limit, meaning that a pure software solution will not be able to perform as well as the transformation engine. Instead, a physical hardware based transformation engine demonstrates a behavior that is dictated by a local Hamiltonian. For this reason the Far Span k-distance connections are rendered redundant. Far and near geometric features are encoded by Spatial Frequency functions. As will be shown the principles of Dielectrophoresis and of Electrorotation are an outcome of the Hamiltonian that is minimized by the transformation engine.

An Action Integral is an integral over space and time of an operator over a function. The operator in the integral is a Lagrangian. If the integral is a sum of a potential and the kinetic energy then the Lagrangian is an Hamiltonian.

Considering the classical physics action of a charged particle in an electric field of another charge that is fixed. The Hamiltonian (L) for speed (v) mass (m) and positive (q1) and negative (q2) charges, and one free particle coordinates x(t), y(t), z(t) such that time (t) is given as:

$$L = -\frac{q_1 q_2}{r^2} + \frac{1}{2}mv^2 = -\frac{q_1 q_2}{x^2+y^2+z^2} + \frac{1}{2}m\left(\left(\frac{dx}{dt}\right)^2 + \left(\frac{dy}{dt}\right)^2 + \left(\frac{dz}{dt}\right)^2\right)$$

If Action over space time is minimized =

$$\text{Min} \int_t \int_x \int_y \int_z L \cdot dx \cdot dy \cdot dz \cdot dt \text{ then}$$

the action's variation vanishes $$0 = \delta \int_t \int_x \int_y \int_z L \cdot dx \cdot dy \cdot dz \cdot dt.$$

Note that the Hamiltonian of the transformation engine will have a hardware implementation using units that behave like induced electric dipoles in the sense that they depend on the gradient of the local electric field E.

The Hamiltonian is an operator that is defined over the location vector function (x(t),y(t),z(t)). Minimizing the Action Integral results in motion equations of the particle that are not fixed. In the calculus of variations the minimization of an action integral simply means that the variation of the action Hamiltonian is either 0 or vanishes.

The transformation engine provides: 1) intermediate patterns representing a metamorphosis between and affected by both input STM pattern and memory LTM pattern, and 2) intermediate patterns that change between the STM and LTM layers such that their respective geometric characteristics are not lost.

Figure 8:
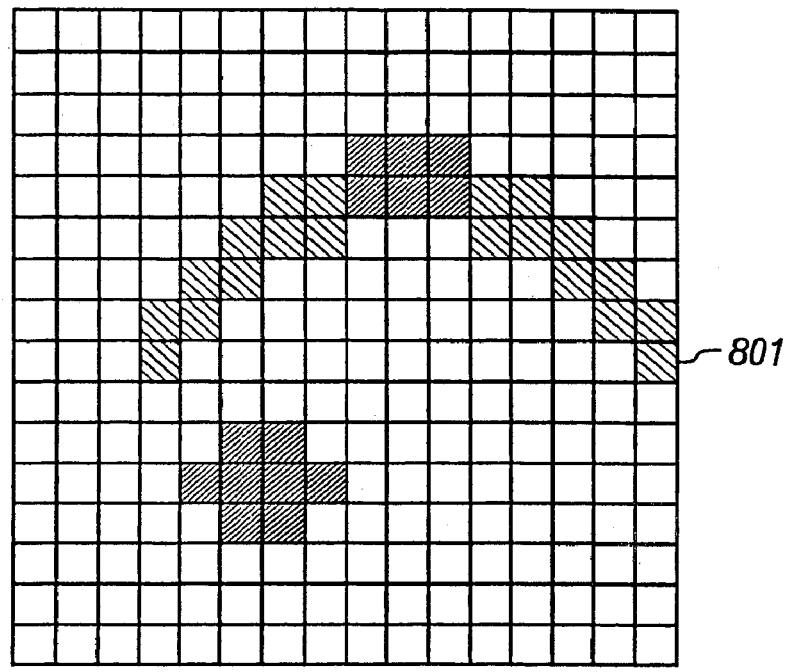
FIG. 8 is an illustration of either the input short term or long term memory in which metal electrodes that are located in the middle of each pixel are each fed with a different alternating or constant voltage at different frequencies.

FIG. 8 is an illustration of either an input STM or LTM including pixels of metal 801, where each pixel of metal 801 is fed with a different alternating or constant voltage at different frequencies. This physical implementation of a transformation engine model provides a solution in which pixels of the same layer/board will not interact with each other in a way that will disrupt the generation of the plurality of metamorphosis patterns between the input STM pattern and memory LTM pattern. From the metamorphic between the LTM and STM patterns and the preservation of geometric characteristics, the transformation engine Hamiltonian is the sum of at least two terms. One term forces the intermediate values of the potential field, that represents a changing pattern, to change between the STM and the LTM patterns and the second term is responsible that geometric information will not be lost in between. A tensor form transformation engine Hamiltonian will also be presented causing a minimization of energy and minimization of the loss of geometric information. Note that, in the physical transformation engine, the action integral need not depend on time although a "full" physical solution must depend on time.

In a two dimensional transformation engine a gradual metamorphosis is generated between the input STM pattern and a memory LTM pattern. If the pattern is encoded by potentials (or some other scalar function) then each pixel in the STM and LTM boards will hold a different potential. For the intermediate potential between the two boards to gradually change it is sufficient to require that the integral of the square of the gradient of the potential to be minimized. In electric field terms, that fits the minimization of the integral on the squared electric field. Multiplying this value by the half of the permitivity factor yields the static electric field energy, $$\text{Energy} = \frac{\varepsilon_0}{2} \int \int \int \left( \left(\frac{dp}{dx}\right)^2 + \left(\frac{dp}{dy}\right)^2 + \left(\frac{dp}{dz}\right)^2 \right) dx \cdot dy \cdot dz$$

The incomplete Hamiltonian of a transformation engine may be written as:

$$L = \left( \left(\frac{dp}{dx}\right)^2 + \left(\frac{dp}{dy}\right)^2 + \left(\frac{dp}{dz}\right)^2 \right) + \text{Unknown term} =$$

$$\nabla p \cdot \nabla p + \text{Unknown term}$$

$$0 = \delta \int \int \int_{Space} (L + \text{Unknown term}) dx \cdot dy \cdot dz$$

0 in the expression above means that the variation of the integral vanishes. This Hamiltonian is equivalent to the square distance between units previously described with respect to reaching the ebbing resonance stage and using the for span k-distance connection to amend the Euclidean distance. In a transformation engine that explicitly uses plurality of layers, information is not lost as a pattern changes from one intermediate layer to an adjacent intermediate layer. As previously described, the Far Span k-Distance Connections is responsible for the conservation of geometry.

Writing this term locally means that the difference of a potential p1 and p2 on layer S will not change excessively in view of the counterparts q1, q2 in layer S+1 or S−1. Thus, $((p_2-p_1)-(q_2-q_1))^2$ must be added to the Hamiltonian, wherein the direction p1 to q1 is the direction of the derivative of the potential.

Figure 9:
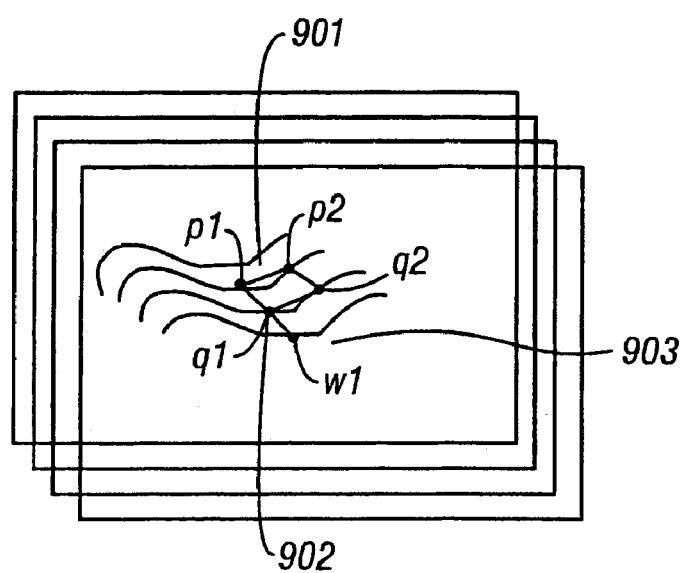
FIG. 9 shows an illustration of a mathematical model of one embodiment of the transformation engine.

The difference between two adjacent intermediate potential layers is also held constant. Referring to FIG. 9, if the Z axis is the direction in which the potential changes and the adjacent potentials along the Z axis are p1 (901) in layer S, q1 (902) in layer S+1 and w1 903 in layer S+2 then it is desirable to minimize $((p1-q1)-(q1-w1))^2$. In general an objective is to minimize $((p_2-p_1)-(q_2-q_1))^2 + ((p1-q1)-(q1-w1))^2$ along the transformation direction. For ease of explanation, Z will be as the local direction of the gradient P. The sum of the last two terms as differentials is then equal to $$\frac{((p2-p1)-(q2-q1))^2 + ((p1-q1)-(q1-w1))^2}{(dZ)^2}$$

In order to write the last term such that the potential p may change in any direction, the general form is $(\nabla\nabla P \cdot \nabla P) \cdot (\nabla\nabla P \cdot \nabla P)$.

In second derivative terms this term can be written as,

Term$_2$ in the lagrangian is the scalar $(\nabla\nabla P \cdot \nabla P) \cdot (\nabla\nabla P \cdot \nabla P)$ $$\nabla P = \begin{pmatrix} \frac{\partial p}{\partial x} \\ \frac{\partial p}{\partial y} \\ \frac{\partial p}{\partial z} \end{pmatrix} \nabla\nabla P = \begin{pmatrix} \frac{\partial^2 p}{\partial x \partial x} & \frac{\partial^2 p}{\partial x \partial y} & \frac{\partial^2 p}{\partial x \partial z} \\ \frac{\partial^2 p}{\partial y \partial x} & \frac{\partial^2 p}{\partial y \partial y} & \frac{\partial^2 p}{\partial y \partial z} \\ \frac{\partial^2 p}{\partial z \partial x} & \frac{\partial^2 p}{\partial z \partial y} & \frac{\partial^2 p}{\partial z \partial y} \end{pmatrix}$$

The second derivative matrix is multiplied by a vector so $$(\nabla\nabla P \cdot \nabla P) =$$

$$\begin{pmatrix} \frac{\partial^2 p}{\partial x \partial x} & \frac{\partial^2 p}{\partial x \partial y} & \frac{\partial^2 p}{\partial x \partial z} \\ \frac{\partial^2 p}{\partial y \partial x} & \frac{\partial^2 p}{\partial y \partial y} & \frac{\partial^2 p}{\partial y \partial z} \\ \frac{\partial^2 p}{\partial z \partial x} & \frac{\partial^2 p}{\partial z \partial y} & \frac{\partial^2 p}{\partial z \partial y} \end{pmatrix} \begin{pmatrix} \frac{\partial p}{\partial x} \\ \frac{\partial p}{\partial y} \\ \frac{\partial p}{\partial z} \end{pmatrix} =$$

$$\begin{pmatrix} \frac{\partial^2 p}{\partial x \partial x}\frac{\partial p}{\partial x} + \frac{\partial^2 p}{\partial x \partial y}\frac{\partial p}{\partial y} + \frac{\partial^2 p}{\partial x \partial z}\frac{\partial p}{\partial z} \\ \frac{\partial^2 p}{\partial y \partial x}\frac{\partial p}{\partial x} + \frac{\partial^2 p}{\partial y \partial y}\frac{\partial p}{\partial y} + \frac{\partial^2 p}{\partial y \partial z}\frac{\partial p}{\partial z} \\ \frac{\partial^2 p}{\partial z \partial x}\frac{\partial p}{\partial x} + \frac{\partial^2 p}{\partial z \partial y}\frac{\partial p}{\partial y} + \frac{\partial^2 p}{\partial z \partial y}\frac{\partial p}{\partial z} \end{pmatrix}$$

Adding the energy Hamiltonian to the Hamiltonian that preserves the geometry in local terms yields:

Hamiltonian=$\nabla P \cdot \nabla P + K(\nabla\nabla P \cdot \nabla P) \cdot (\nabla\nabla P \cdot \nabla P)$+Optional additional terms where K is some constant.

The optional terms may involve higher derivatives of the potential P. This function is the Hamiltonian of a transformation engine according to the present invention; the plurality of metamorphosis patterns between two boundary conditions which are the input STM pattern and the memory LTM pattern as described.

Note that a second derivative of the potential is multiplied by the first derivative resulting a product in the form of a vector. Such a term is consistent with elongated induced dipoles in a local electric field. This is because electric dipoles respond to or "feel" force when they are positioned in an electric field such that the second derivative does not vanish. Elongated dipoles that are made of conductive material align with the first derivative of the potential and therefore the Hamiltonian that is the result of the previous illustration implicitly dictates the use of elongated dipoles. In order to be totally consistent with the Hamiltonian the dipoles should be ideal needles at sufficiently high resolution and with no or minimal resistance.

Dielectrophoresis itself is insufficient to explore the description of elongated induced dipoles. The net force on an isotropic elongated dipole in an electric field depends on the fields alternating and constant components e.g., $V=V_{base}+A*\cos(\omega t)$ such that $\omega$ is the frequency of the alternating component, A is the amplitude in voltage and $V_{base}$ is the voltage baseline. The force on a spherical dipole may be expressed as:

$$F_{Dipole} = 2\pi R^3 \epsilon_m Re[k(\omega)] \nabla E^2$$

Such that K is the Clausius Mossotti constant. This refers to the relationship:

$$k(\omega) = \frac{\varepsilon_p^* - \varepsilon_m^*}{\varepsilon_p^* + 2\varepsilon_m^*}$$

such that $$\varepsilon^* = \varepsilon - \frac{j\sigma}{\omega}$$

and σ is the conductivity of the particle wherein 'm' and 'p' stand for medium and particle (respectively) and j is the square root of −1. Note that the third power of R makes it difficult to exert strong forces using spherical particles especially when R is very small. Further, the conductivity is extremely important in order to achieve highly responsive particles. A more complex model is of particles on which the electric force depends on the frequency ω. A highly conductive needle shaped particle redirects the electric field because the potential depends on the orientation of the needle. The term $2\pi R^3$ can be ignored for needles. Thus, the needle will be parallel to the field. We know from the simple case of constant dipoles that the minimum energy of a dipole D in a field E is u=−D*E where D is the dipole.

The transformation engine Hamiltonian and the square force on a local dipole are linearly dependent $$\left(\frac{1}{2}(\nabla E^2)\right)^2 = (E \cdot \nabla E) \cdot (E \cdot \nabla E) \propto F_{Dipole}^2.$$

Note that minimizing the geometric part of the transformation engine Hamiltonian means that the integral of the square force on all the dipoles is minimized. This result may not be readily apparent in light of the energy of a spring is $$\frac{1}{2}KX^2 = \frac{1}{2K}(K^2 X^2) = \frac{1}{2K}F^2$$

where K is the spring constant.

The variation of the transformation engine Hamiltonian must vanish between the input STM pattern (first boundary condition) and the memory LTM pattern (second boundary condition), so:

$$0 = \delta \iiint_{x,y,z} (\nabla P \cdot \nabla P + K(\nabla \nabla P \cdot \nabla P) \cdot (\nabla \nabla P \cdot \nabla P)) dx \cdot dy \cdot dz$$

If the number of layers in the transformation engine is sufficiently large and the distance between the STM and LTM is also sufficiently large and fields are relatively strong then the constant K can be very large. In practice the transformation engine can work with very high terms of K of about 4096 and if the gradient of p is calculated over far points within the same layer then K can even be $10^5$ or larger. The larger the K constant is, the closer the transformation engine is to a complex springs machine. Note that for practical applications of the transformation engine one potential is insufficient.

The theory about spherical isotropic particles that are placed in an electric field is insufficient when the shape of the particle is not spherical. The Hamiltonian of the transformation engine requires ideal needle shaped particles. The dependence of the net force on a dipole depends of the gradient of the electric field and that feature is applicable also in non-spherical dipoles.

Instead of using a single potential, p, several potentials should be used in order to resolve two dimensional ambiguities. That is, e.g., different alternating voltage frequencies and elongated pieces of material/particles/proteins/neurotransmitters that reside between the LTM and STM pixel boards can serve as vector fields because an elongated particle points to a direction and behaves like a needle that is placed in electric field and turns until it reaches equilibrium in minimum energy. If such "needles" respond to different frequencies and each "needle" is wrapped in an isolating ball, then the needles align like vectors in local fields. Since needle characteristics may be selected so that the needles selectively respond to different frequencies, the system of two pixel boards, STM and LTM and dipoles that respond to different voltage frequencies—"different needles"—simulate a multi potential system.

The Hamiltonian of multiple potentials P(i) may be expressed as:

$$\sum_{i=1}^{n}\sum_{j=1}^{n} \nabla P(i) \cdot \nabla P(j) + K(\nabla \nabla P(i) \cdot \nabla P(j)) \cdot (\nabla \nabla P(i) \cdot \nabla P(j))$$

such that the variation over the n potentials vanishes, as follows:

$$0 = \delta \iiint_{x,y,z} \sum_{i=1}^{n}\sum_{j=1}^{n} (\nabla P(i) \cdot \nabla P(j) + K(\nabla \nabla P(i) \cdot \nabla P(j)) \cdot (\nabla \nabla P(i) \cdot \nabla P(j)))$$

$$dx \cdot dy \cdot dz$$

in a gray scale image. This mathematical formulation is consistent with at least one preferred embodiment of a transformation engine according to the invention.

The mixed term of:

$$\sum_{i=1}^{n}\sum_{j=1}^{n} (\nabla P(i) \cdot \nabla P(j) + K(\nabla \nabla P(i) \cdot \nabla P(j)) \cdot (\nabla \nabla P(i) \cdot \nabla P(j)))$$

is made of two parts, namely:

The part of the Hamiltonian that forces the pattern to gradually change from the input STM to the memory LTM pattern may be expressed as:

$$\sum_{i=1}^{n}\sum_{j=1}^{n} \nabla P(i) \cdot \nabla P(j)$$

Minimization of this term alone means an electric like field lines between the input STM pattern and the memory LTM pattern:

a) The part of the Hamiltonian that forces the pattern to maintain its geometric properties as it gradually changes from the input STM pattern to the memory LTM pattern is $$K * \sum_{i=1}^{n} \sum_{j=1}^{n} \nabla\nabla P(i) \cdot \nabla P(j)) \cdot \nabla\nabla P(i) \cdot \nabla P(j)$$

such that K is some constant.

A gray scale image can be decomposed into high and low frequency Fourier Transforms. A single picture can be translated into multiple pictures using either Fourier Transforms or Wavelet Transforms. In an input STM pattern there are wide vertical stripes and an LTM pattern where the stripes are narrow, the Fourier Transform frequencies that will maximize on the STM pattern will be lower than the Fourier Transform frequencies that will maximize on the input STM pattern. The Hamiltonian that is minimized therefore must include mixed terms if the potentials P(i) need to represent different frequencies Fourier Transforms.

A Hamiltonian that is made of different potentials reduces the degrees of freedom of the transformation between the input STM pattern and the memory LTM pattern.

A potential is a function from $R^n$ to R. The explicit second order (second derivatives) Hamiltonian is:

$$\sum_{i=1}^{n} \sum_{j=1}^{n} (\nabla P(i) \cdot \nabla P(j) + K(\nabla\nabla P(i) \cdot \nabla P(j)) \cdot (\nabla\nabla P(i) \cdot \nabla P(j)))$$

such that P(i) are the potentials.

Renormalization group methods and introduced to provide a method of treating systems in which multiple degrees of freedom spanning many scales of length are locally coupled. At the end of each step a Hamiltonian results that represent the interactions over length scales not yet treated. In particular, changes in gray-scale levels occur over many scales of length for which the image is organized. Thus, the transformation engine integrates many prior data that comes from lower level neurons such as V1, V2, LGN and integrates all this data into single high-level Neurons.

Figure 10:
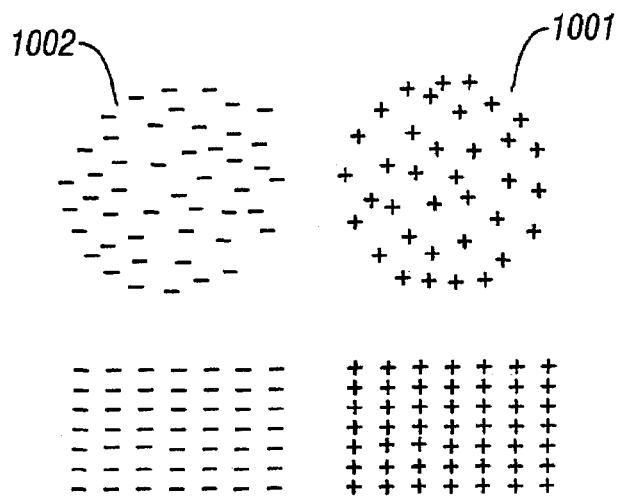
FIG. 10 shows how a disk filled of "−" signs may be mapped to a disk filled with "+" signs in a comparison of images.

Coupling, is in terms of the Hamiltonian because the different scales of features in one image may fit different scales of features in another. For example wide lines in the input image may be fit to narrow lines in the memory image. The fitting problem may be even more complex. As shown in FIG. 10, it may be desirable to map a disk that is full of + signs 1001 to a disk full of − signs 1002 or to map such rectangles without coupling. Coupling is a mathematical term that is a part of the Hamiltonian of a system such that it includes multiplication of functions with different indices. (E.g., $f_1(x,y)*f_2(x,y)+f_1(x,y)*f_3(x,y)+f_2(x,y)*f_3(x,y)$ that is a sum of three coupled terms $f_1(x,y)*f_2(x,y)$, $f_1(x,y)*f_3(x,y)$ and $f_2(x,y)*f_3(x,y)$ such that x,y are planar coordinates.)

Coupling may involve dipoles that are subject to maximum torque force when exposed to two different frequencies of alternating voltage. Thus the mixed terms in the transformation engine Hamiltonian can be implemented using, for example, Evotec OAI technology. A parceling of two particles that each responds to different frequency provides an exact solution to the coupling problem.

Two boundary conditions of the LTM and STM are well defined. Those are the LTM board and the STM board. The potential LTM=P(X,Y,0) and STM=P(X,Y,1) denote the LTM and STM patterns respectively. The convergence of the mapping between the LTM and the STM such that the topology is preserved depends on the distance between the LTM and the STM. Based on this constraint, the gradient of the potential should be as perpendicular as possible to the LTM and STM boards.

Figure 11:
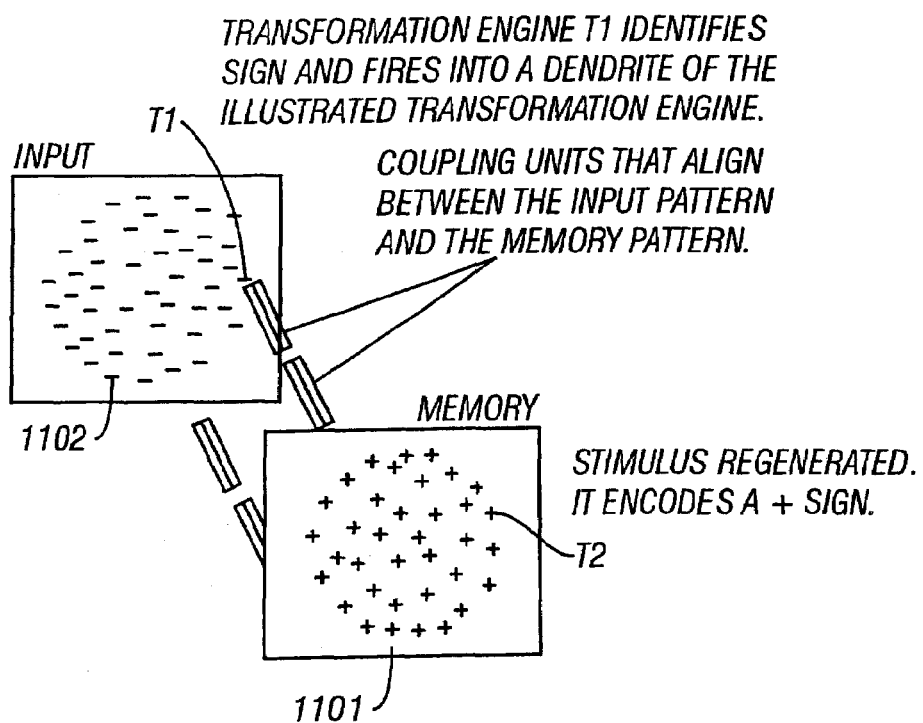
FIG. 11 shows the interaction between the input layer and the memory layer within a transformation engine.

Referring to FIG. 11, the "+" sign 1101 is encode by a 5000 Hz alternating voltage that is fed to part of pixels in memory pattern and 1000 Hz encode the '−' sign 1102 on the input pattern. Units that respond to both 5000 Hz and to 1000 Hz generate the map between the input pattern and the memory pattern.

The transformation engine Hamiltonian of a single potential is consistent with the laws defined by General Relativity. It is probable that the description of matter in the cosmos as a transformation engine requires more than one potential. However, for the purposes of the present illustration, one potential is used herein and developed into tensor form for simplicity of explanation. The transformation engine can take an interesting General Relativistic form with the following geometric implications. To express the transformation engine in terms of covariance principle articulated by Einstein, it is sufficient to replace the x,y,z parameterization with x,y,x,ct such that c is the speed of light and t is the time, and to replace each derivative with a Covariant or with a Contravariant derivative. Einstein's summation conventions will be used (upper and lower indices are summed up).

Writing L in Einstein's tensor convention provides:

$$L = (p^i p_i + K p^n p_{k;n} p^m p^k;_m) \sqrt{-g}$$

such that p is the pattern potential that gradually changes between the STM and the LTM patterns.

In the present case, LTM can be a known distribution of the potential field p in the past t=0 and the STM can be a current distribution for t=1 such that a description of the cosmos may be expressed in terms of what happens in-between. In such a case the Hamiltonian L can have terms higher orders for example:

$$L = (p^i p_i + K p^n p_{k;n} p^m p^k;_m + K^{4/3} p^n p_{k;L;n} p^m p^{k;L};_m) \sqrt{-g}$$

where −g is the minus sign of the determinant of the metric tensor, the square root of −g is the scaling factor of a volume element, where K is a constant and the semi colon; denotes the covariant derivative. The power 4/3 is provided to account for dimensionality. The Hamiltonian can be written in another form $$L = (p^i p_i + p^n A_{kn} p^m A^k{}_m + p^n B_{kLn} p^m B^{kL}{}_m) \sqrt{-g}$$

where A and B are high-order tensors if $p^m p^k;_m = 0$ then $P^m$ is geodetic.

In terms of differential geometry $p^m p^k;_m$ is an evaluation of how parallel the field $p^m$ changes in relation to itself. If this term is 0 then $p^m$ is a geodetic field and it represents an inertial particle. If this term is not 0 then it means that a "force" acts on matter. For this reason the transformation engine can be one of the models a unified force theory of the fine fundamental forces.

Using the Christoffel symbols {kn,u}, comma for derivative and $g_{ij}$ as the metric tensor, results in the relationship:

$$L = (P_{,m} P_{,k} \; g^{mk} + K \; g^{LK}(p_{,j} g^{in}(P_{,k,n} - \{kn,u\} P_{,u})(P_{,j} g^{in} (P_{,L,n} - \{Ln,u\} P_{,u}).) \sqrt{-g}$$

the square root of the −g term is always used in General Relativity for the measurement of a 4-volume element on the space-time manifold.

The Cristoffel symbols written explicitly provides:

$$\{kn, u\} = \frac{1}{2} g^{\lambda u}(g_{k\lambda,n} + g_{n\lambda,k} - g_{kn,\lambda})$$

The variation over the space-time manifold should vanish, that is, $$0 = \delta \int_\Omega \left( P_{,m} P_{,k} g^{mk} + Kg^{Lk} \left( P_{,j} g^{jn} \left( P_{,k,n} - \left\{ \begin{matrix} u \\ kn \end{matrix} \right\} P_{,u} \right) \right. \right.$$
$$\left. \left. \left( P_{,j} g^{jn} \left( P_{,L,n} - \left\{ \begin{matrix} u \\ Ln \end{matrix} \right\} P_{,u} \right) \right) \sqrt{-g} \ d\Omega \right.$$

such that Ω is the 4-volume space-time domain.

Transformation engines according to another embodiment of the present invention may also be constructed using FM and microwave frequency electric diploes. As described, the transformation engine uses units that align and generate a plurality of intermediate patterns between the input STM pixels board and the LTM memory board. One method of accomplishing this is by using a spring or a coiled shaped polymer that is coated with metal. The two tips of the spring are ball shaped and the entire spring is embedded in a spherical polymer as appears in FIG. 12.

Figure 12:
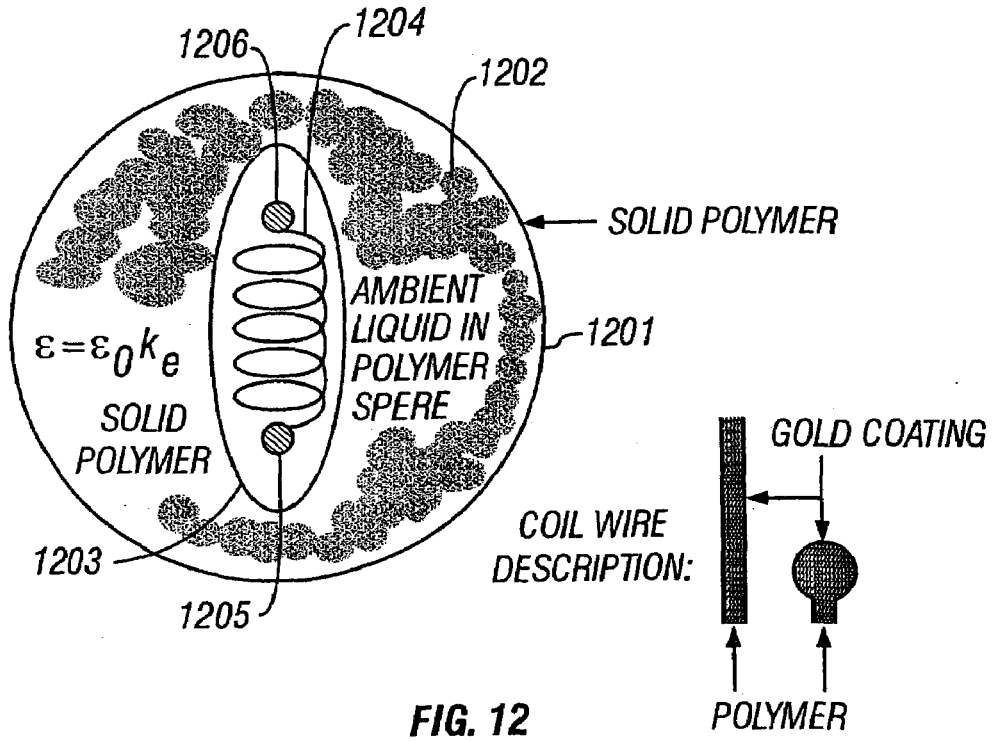
FIG. 12 shows one embodiment of a unit or cell used in an embodiment of the transformation engine.

Each unit in FIG. 12 includes a sphere 1201. Within sphere 1201 there is a liquid with a dielectric constant ($K_e$) 1202 as close to 1 as is possible with some types of oils. The core 1203 of sphere 1201 is free to turn sphere 1201 (such as a baseball shaped polymer). Core 1203 may, for example, contain coil 1204 with two ball shaped tips 1205 and 1206 attached. For proper functioning of the transformation engine the units must be free to be aligned within a field. For example, the dipole may be baseball shaped, spring shaped or in the shape of a needle. Spherical diploes do not redirect the external field and can only perform conformal maps because of Laplace' equation. Conformal maps map tangent curves to tangent curves and thus spherical dipoles (that effectively change the permitivity of space) should generally not be employed by the transformation engine.

The approximated maximum force that will be felt by the unit depends on 1/LC where that L is the coil's magnetic induction constant in units of Henries and C is the capacitance of the dipole. A formulation of the optimum frequency of an external electric field also depends on other factors such as resistance.

A single unit can contain two different parallel coils and can thus respond to two independent frequencies. This property is useful in order to obtain appropriate coupling. Coupling in the transformation engine sense is broader than in Ising spin models because real induced dipoles can point to any direction and the coupling relates to frequencies and not of quantum spins. The coil or spring shaped dipole or two dipoles in each unit cause the unit to turn, or align, in response to local fields at different frequencies (e.g., 10000 KHz and 57000 KHz) and other whole multiplicity of these two basic frequencies (e.g., n*10000 KHz and m*57000 KHz) wherein m and n are whole numbers greater than or equal to 1.

These units can be placed on many boards, or inner layers, between the input pixels board (containing the STM and LTM patterns) and they can be suspended in liquid between the input and the memory boards.

Figure 13:
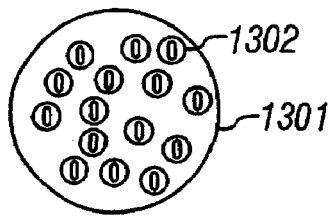
FIG. 13 shows a spherical cell of a solid transformation engine including a colloid with suspended dipolar media units.

As shown by FIG. 13, the inner layers, in solid systems, may be considered boards 1301 of spherical cells in which these units 1302 are suspended. The number of possible solid configurations is limited by the corresponding physics.

Figure 14:
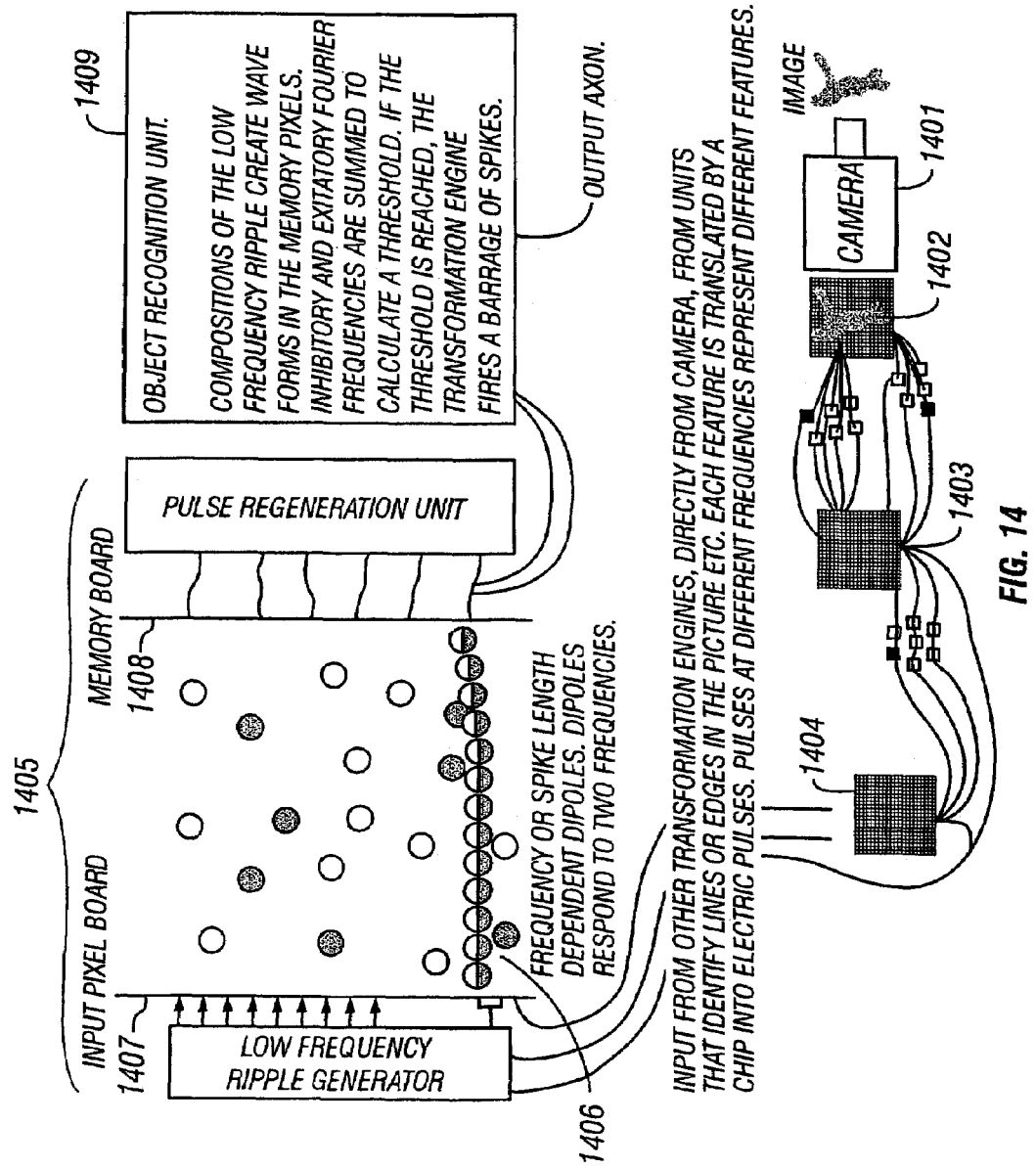
FIG. 14 shows a transformation engine including a liquid media suspending or including dipolar media units according to an embodiment of the present invention.

As shown in FIG. 14, one example solution is to mix many different units of 40 nm of size between the input and memory boards. These units are then suspended in water or other suitable liquid or, more generally, fluid and respond to the electrodes that are connected to the middle of each Input and memory pixel. This configuration may be viewed as a "liquid transformation engine".

Camera 1401 is used to convert an image into electrical signals on pixel board 1402. Edge detectors check groups of adjacent pixels for horizontal, vertical and diagonal lines. Identified edges are contained in pixel board 1403. This may be accomplished by the edge detector which identifies the edge firing at a certain frequency into pixel board 1403. Additional and more complexed detection may also be performed on the pixel boards. For example, a object recognition software may be used to identify various objects such as a human heel, an ear, a nose, or other predefined objects. Detection units which objects within portions of the pixel image may also fire at specific frequencies into corresponding pixels of pixel board 1404. Both pixels boards 1403 and 1404 are connected to transformation engine 1405. Specific pixels in the transformation engine's input pixel board receives pulses both for the existence of an edge and for the existence of identified objects. Electric dipoles 1406 within the transformation engine align such that the energy between the input board 1407 and the memory board 1408 is minimized. Within the transformation engine the suspended units maneuver or are otherwise positioned and/or oriented to accomplish this alignment within the surrounding material, such as the liquid. Individual units may respond to different frequencies and create a mapping between dissimilar objects such as an input of "x's" to a memory of "o's". The memory board is connected to a regeneration oscillator chip. The chip is able to "learn" (i.e., characterize) the pulses coming from the input board and later to regenerate these pulses. Object recognition unit 1409 analyzes the signals received from the input board. If these signals match the learned and stored signals then the transformation engine fires in order to indicate or signal a match between the image and the stored information.

Note that a solid solution may be less efficient than a liquid or gaseous solution. In the solid machine the spherical units also have a core that is an elongated dipole, possibly spring shaped, that is free to turn in space. The units should have a limited angular freedom of movement. The spheres denote the cells that contain spring shaped elongated dipoles.

Figure 15A:
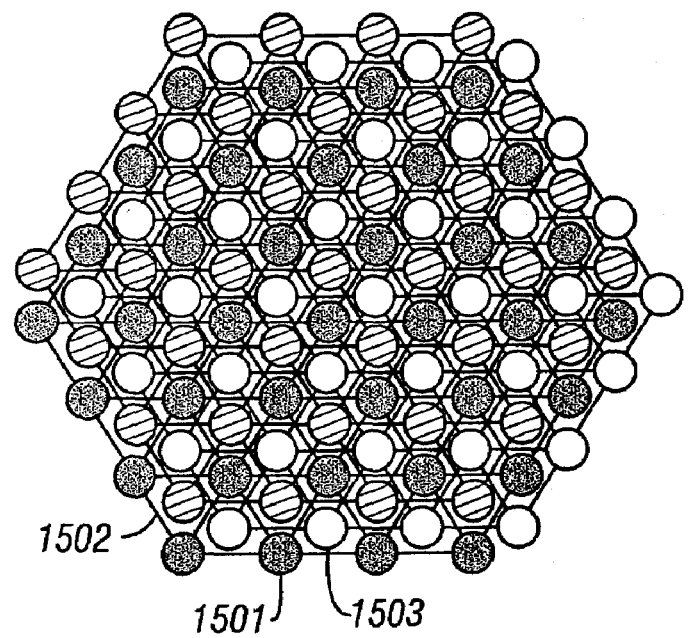
FIG. 15A shows the cyclic structure of the S, S+1, and S+2 nature of the three layers of a dipolar transformation engine.

FIGS. 15A and B illustrate a solid structure which may be used as a transformation engine. In this embodiment the dipolar units in a dipolar transformatron can be ordered in a cyclic structure of three planar layers. In each such layer the elongated dipoles are positioned in the vertices of 60°, 60°, 60° triangles. Each layer is shifted downward by 1/√3 in relation to its previous layer. Due to differences in the number of units along diagonal paths and perpendicular paths from the input to the memory layer, and vice versa, the space between the layers (the interlayer substance) is filled with non homogenous material; otherwise the layer's structure is totally homogenous.

Figure 16:
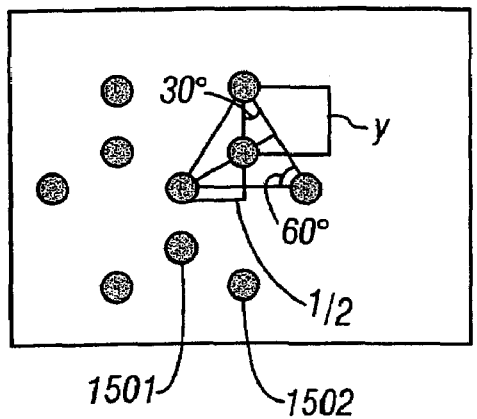
FIG. 16 shows the orientation of the layers when the distance of each vertex from the heights intersection is $$\frac{1}{\sqrt{3}}$$
Figure 15B:
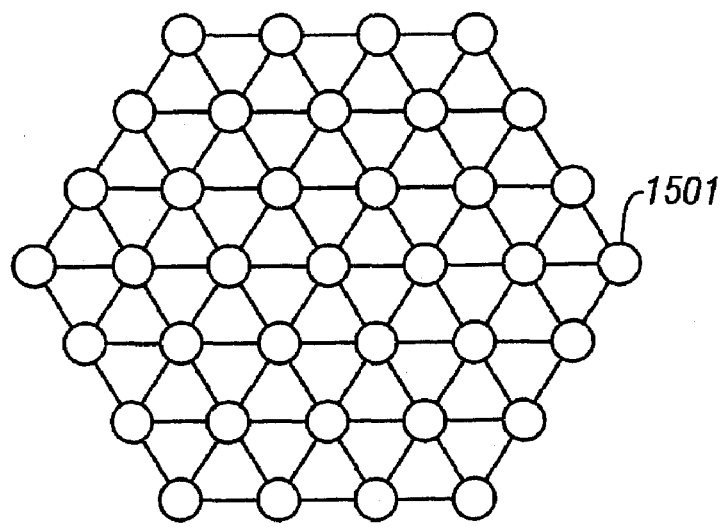
FIG. 15B shows the top layer, S, of the dipolar transformation engine.

FIG. 15A illustrates layers S, S+1, S+2 on top of each other while FIG. 15B illustrates top layer S 1501. Referring to FIG. 15A, layers S (1501), S+1 (1502), S+2 (1503) show a cyclic structure of three layers. The structure of each layer is just 60°, 60°, 60° isosceles triangles that optimally cover or tile the plane. The layers are identical in structure. Each two adjacent layers are shifted by a distance of 1/√3 units of length. Each of the triangle sides is 1 unit long. The geometric intersection of the medians and the heights of each triangle in layer S is the same. The distance of each vertex from the heights intersection is $$\frac{\frac{1}{2}}{y} = \cos(30°) = \frac{\sqrt{3}}{2} \Leftrightarrow y = \frac{1}{\sqrt{3}}$$

as in FIG. 16.

FIG. 16 shows the orientation of the layers when the distance of each vertex from the heights intersection is $$\frac{1}{\sqrt{3}}.$$

In order to allow stationary transformations with this embodiment, each unit in layer S should have the same distance from its counterpart in layer S+3 as from the closest 3 units in layer S+1.

Note that some energy will be required for a dipole to change position because of the elongated nature of the dipole. This elongation along with the nonlinear nature of dipole-dipole interactions allows local competition, a trait important for topology conservation and fundamental to a transformation engine according to a present embodiment of the invention.

Each unit in layer S must have the same distance from four other units, one in layer S+3 and 3 in layer S+1. This condition imposes the following distance d between layers, $$3d = \sqrt{\left(\frac{1}{\sqrt{3}}\right)^2 + d^2}.$$

The distance between layer S to S+1 is d and therefore the distance from the counterpart dipole in layer S+3 is 3d. The distance to each one of the closest units in layer S+1 is by Pythagoras $$\sqrt{\left(\frac{1}{\sqrt{3}}\right)^2 + d^2}.$$

From this equation $$d = \frac{1}{\sqrt{24}} \cong 0.204$$

and the distance between the closest units is therefore R=3d≅0.6124.

An important value is the ratio $$Q = \frac{1}{R^4}$$

that is an approximated ratio between the forces of closest units within layer S and between each unit in S and each one of the 4 closest units, 3 in layer S+1 and one in layer S+3.

Q=7⅑. This high quotient implies that most of the influence on each dipole comes from interactions between adjacent layers.

Another issue addressed by the transformation engine resolution. In particular, if the transformation is stationary then the layers resolution is only ⅓ in the case where the transformation includes all the layers. This fact implies an emergent property of the triangular structure of the dipolar transformatron; different levels of transformations use different paths. A collision between two paths may be a sign that there is a contradiction in the mapping process and therefore an AC signal, even if the induced dipoles are quick, will lead to a welcome instability.

As mentioned previously, preprocessing may be performed on the values associated with the input pattern and the memory pattern. For example, preprocessing may be performed to replace the ACCGTGGA sequence for DNA comparison with a logical "1". The complement of the ACCGTGGA sequence is a CCCTGGCACCTA sequence because the ACCGTGGA sequence may bind to the CCCTG-GCA sub-string. Preprocessing may be performed on the CCCTGGCACCTA sequence to replace the sequence with a logical "0". The preprocessed values may then be inserted into the appropriate layers.

Another embodiment of the invention provides a Transformatron model in Riemannian Geometry. In contrast to the prior embodiment implementing a Far Span K–Distance Connections, the following embodiment uses covariant generalization in Riemannian geometry and thus allows complex matching between low dimensional patterns which is more difficult in Euclidean geometry.

As was described above in connection with the first embodiment, a transformation between boundaries, memory layer and input layer (e.g. ellipse drawn on the plane x,y,0 in $R^3$ as $p(x_{ellipse}, y_{ellipse}, 0) = 1$ and 0 is elsewhere in the plane where the ellipse curve is not present and between a circle drawn on the plane x,y,1) can be done such that an intermediate pattern on the intermediate plane x,y,0.5 will emerge (e.g. an ellipse that is an intermediate pattern between the ellipse on the plane x,y,0 and between a circle on the plane x,y,1 in $R^3$). This is done by defining a local cost function such that minimizing that local cost function causes a potential function p to be defined throughout the entire region between the boundaries. This method is used in order to match patterns by a later step that was named, "vibration waves".

By matching through curved space, more complex matching tasks can be successfully achieved as curved geometry allows parallel lines to exist between the input pattern and the memory pattern even if in flat geometry this task is impossible. For example one can imagine parallel straight lines connecting a circle on x,y,0 plane with a circle drawn on the x,y,1 plane. If instead of circle, an eccentric ellipse is drawn on the x,y,0 plane then one can't match between the ellipse on x,y,0 and a circle on x,y,1 by using only straight parallel lines. This task, however, can be achieved if the space itself is curved as defined in Riemmanian geometry. Further, the minimum energy function has a formalism such that the Euler Lagrange operator of the minimum energy function yields tensor densities. As a result, the matching process is stable in curved spaces. This minimum energy function can further be used as computational basis for the development of new theories in physics.

The modification to the minimum energy function used according to an embodiment of a method of the invention may be described as follows. In Riemannian geometry language the minimum energy to be minimized can be written as $$\frac{\begin{pmatrix} K_1 P_i P^i + \\ K_2 \left( \frac{(P_{r;s} - P_{s;r})(P_{L;k} - P_{k;L}) g^{rL} P^s P^k}{P^i P_i} + \frac{(P^\lambda P_\lambda)_{,m} (P^s P_s)_{,k} g^{mk}}{P^i P_i} \right) + \\ K_3 \left( \frac{(P^\lambda P_\lambda)_{,m} P^m}{P^i P_i} \right)^2 + \\ K_4 R \end{pmatrix}}{\sqrt{\pm g}}$$

Where: g is the determinant of the metric tensor, upper indices denote contravariant tensor property, lower indices denote covariant tensor properties, $P_i$ denotes a gradient $$P_i \equiv \frac{\partial P}{\partial x^i}$$

of a gradually changing function P, That changes between the memory and input layers, $(-d<x^1<d,-d<x^2<d, \ldots x^j, \ldots -d<x^n<d)$, $(-d<x^1<d,-d<x^2<d, \ldots x^j+\delta, \ldots, -d<x^n<d)$ (when n is the dimension of a Riemannian manifold and d>0 is a very large in relation to δ>0) Semi colon denotes a covariant derivative and comma denotes an ordinary derivative, $$P_{i,j} \equiv \frac{\partial P_i}{\partial x^j}.$$

R denotes the scalar curvature also known as Ricci scalar. $K_1$, $K_2$, $K_3$, $K_4$ denote constants of the model.

The reason to include the curvature R as cost function is in order to penalize curvature which means that matching between patterns will not be at any cost but rather will be also regulated when curvature also costs energy.

According to the earlier described embodiment, the energy function that was minimized was:

$$\sum_{k=1}^{n} \left( \left( \sum_{\lambda=1}^{n} \left( \frac{\partial}{\partial x^k} P_\lambda \right) P_\lambda \right) \left( \sum_{\lambda=1}^{n} \left( \frac{\partial}{\partial x^k} P_\lambda \right) P_\lambda \right) \right)$$

and in full tensor language $P^s P_{r;s} P^s P^r_{;s}$. This minimum energy function is applicable only in flat space and it's Euler Lagrange operator does not yield tensor densities.

A thorough explanation for the theory is as follows. As described above in connection with the previous embodiment, the Far Span k-Distance Connections has both digital and continuous forms. The continuous form of the energy described above may be expressed as $$\sum_{i=1}^{n} \left( \frac{\partial P}{\partial x^i} \right)^2 + K \sum_{i=1}^{n} \left( \sum_{j=1}^{n} \frac{\partial^2 P}{\partial x^i \partial x^j} \frac{\partial P}{\partial x^j} \right)^2$$

when upper indices are x coordinate indices and not powers and n is the dimension of the compared memory and input patterns and K is constant or changing in a relaxation process. In tensor form the function may be written as $(P_\nu P^\nu + K P^j P^i_{;j} P^L P_{i;L}) \sqrt{g}$ when $P^j P^i_{;j} P^L P_{i;L}$ was the continuous local form of the Far Span k-Distance Connection. Semi colon denotes the covariant derivative and indices of P denotes the pattern function that is known on the memory layer and on the input layer. Also, $$P_j \equiv \frac{\partial P}{\partial x^j}.$$

$P^j P^i_{;j} P^L P_{i;L}$ has several problems significantly including a numerical instability of the matching between the memory and input layers.

To address these problems, we can define the Far Span k-Distance Connection as a minimum energy function that depends on the second order derivatives of a pattern P that is defined on two boundaries, with upper indices describing coordinate indices and not powers, boundary $(-d<x^1<d,-d<x^2<d, \ldots x^j, \ldots -d<x^n<d)$ and boundary $(-d<x^1<d,-d<x^2<d, \ldots x^j+\delta, \ldots,-d<x^n<d)$ (when n is the dimension of a Riemannian manifold and d is very large in relation to δ).

This is in contrast to the prior definition of the domain, $(-d<x^1<d,-d<x^2<d, \ldots, -d<x^n<d)$ and the boundaries $(-d<x^1<d,-d<x^2<d, \ldots x^j, \ldots -d<x^n<d)$, $(-d<x^1<d,-d<x^2<d, \ldots x^j+\delta, \ldots,-d<x^n<d)$ Referred to an Euclidean space, e.g. $R^3$.

If one boundary $(-d<x^1<d,-d<x^2<d, \ldots x^j, \ldots -d<x^n<d)$ contains a pattern drawn as p and the other boundary has another definition of p we called $(-d<x^1<d,-d<x^2<d, \ldots x^j, \ldots -d<x^n<d)$, memory layer and input layer. We then tried to connect the pattern p on both layers by the vector field which is generated by the gradient of this field p such that the gradient of p will form a vector field on the domain $(-d<x^1<d,-d<x^2<d, \ldots,-d<x^n<d)$ between the memory layer and the input layer and such that the gradient of p will form curves as parallel and as straight as possible.

Transformations between p that is defined on the input layer and p that is defined on the memory layer need not be linear, e.g. a transformation between two hand written signatures defined on two parallel planes x,y,0 and x,y,1 as p≠0 for ink dot and p=0 for blank paper.

The restriction of matching between such two patterns in Euclidean space doesn't make any sense because in curved space matching can be easier to perform.

The reason is that if parallel $$\text{Gradient}(p) = \frac{\partial p}{\partial x^i}$$

for all i will not always be able to form parallel curves in Euclidean spaces but will be able to form parallel geodesic curves in curved space and thus allow a method by which a wider range transformations will be covered by the disclosed method.

The geometric motivation for extending the method may be explained as follows. A problem is that, given two Gaussian coordinate boundaries, $(-d<x^1<d,-d<x^2<d, \ldots x^j, \ldots -d<x^n<d)$, $(-d<x^1<d,-d<x^2<d, \ldots x^j+\delta, \ldots,-d<x^n<d)$ (when n is the dimension of a Riemannian manifold and d is a very large in relation to δ) and a scalar field P which its $P^2$ values are known on these boundaries, and so is the geometry of the boundaries as geometric objects is also known, and $0 \leq P^2 \leq 1$, on each one of the boundaries, define a Lagrangian such that the integral of $(P^iP_i)^m$ s.t.

$$P_i = \frac{\partial P}{\partial x^i}$$

when the power $m \geq 1$ will be globally minimal under the conditions: $P^2 \geq \epsilon^2$ for some minimal value $\epsilon^2$ and $|P_i|^2 \leq L^2$, for some maximal value $L^2$. Here upper indices denote the contravariant property, lower ones the covariant one and $x^i$ denotes the coordinates. The problem is also known as optimization of Homotopy. See, e.g., Victor Guillemin, Alan Pollack Differential Topology, Homotopy and Stability, pages 33,34,35, ISBN 0-13-212605-2. Surprisingly, minimizing Lagrangians that involved only first order derivatives of the scalar field P did not accomplish the required global minimum.

An interesting problem is to assign the root of the Ricci scalar (see David Lovelock and Hanno Rund, Tensors, Differential Forms and Variational Principles 261, 3.26, ISBN 0-486-65840-6) to P or in pattern recognition language, to use the Ricci scalar to encode two compared boundaries on which a geometric pattern is known. Intuitively speaking, the problem quite resembles comparing two hand written signatures such that each signature is etched (as the Support $P \neq 0$) on a two dimensional plane and two planes with such signatures are parallel at distance $\delta$ one from the other, $(-d<x^1<d,-d<x^2<d, \ldots x^j, \ldots -d<x^n<d)$, $(-d<x^1<d,-d<x^2<d, \ldots x^j+\delta, \ldots ,-d<x^n<d)$.

A good matching between these two signatures will be achieved by a vector field $$P_i = \frac{\partial P}{\partial x^i}$$

that can be interpreted into curves connecting the two planes. If for example one signature is an ellipse and the other one is a circle then checking the intersection of the field $P_i$ with the intermediate plane, $$\left(-d < x^1 < d, -d < x^2 < d, \ldots x^j + \frac{\delta}{2}, \ldots , -d < x^n < d\right)$$

will be also an ellipse with eccentricity half the one of an ellipse which is defined by $P \neq 0$ on, $(-d<x^1<d,-d<x^2<d, \ldots x^j+\delta, \ldots ,-d<x^n<d)$.

Surprisingly, according to computer simulations, in order to achieve such a field as a result of Euler Lagrange equations and of the calculus of variations, derivatives of the vector field $P_i$ must be used. Using the well known covariant and contravariant indices notation of modern Riemannian Geometry, interesting candidate Lagrangians for exploration are $$L = \left(\frac{(P^\lambda P_\lambda)_{;m} P^m}{P^i P_i}\right)^2 \sqrt{g}$$

when semi colon denotes the Covariant derivative and g denotes the determinant of the Metric Tensor. An alternative is $$L = \left(\frac{(P_{r;s} - P_{s;r})(P_{L;k} - P_{k;L})g^{rL}P^s P^k}{P^i P_i} + \frac{(P^\lambda P_\lambda)_{;m} (P^s P_s)_{;k} g^{mk}}{P^i P_i}\right)\sqrt{g}.$$

The latter is suitable for yielding a meaningful theory also when $P_i$ is not a gradient of some scalar field p when possibly $$\frac{(P_{r;s} - P_{s;r})(P_{L;k} - P_{k;L})g^{rL}P^s P^k}{P^i P_i} \neq 0.$$

As we found out in low dimensions, a stabilizing Lagrangian is the KG operator $P_iP^i$ and a meaningful theory is to minimize an integral of the form, $$\int_\Omega \left( \begin{array}{c} K_1 P_i P^i + \\ K_2\left(\frac{(P_{r;s} - P_{s;r})(P_{L;k} - P_{k;L})g^{rL}P^s P^k}{P^i P_i} + \frac{(P^\lambda P_\lambda)_{;m} (P^s P_s)_{;k} g^{mk}}{P^i P_i}\right) + \\ K_3\left(\frac{(P^\lambda P_\lambda)_{;m} P^m}{P^i P_i}\right)^2 \end{array} \right) \sqrt{g}\, d\Omega$$

(see, U.S. patent application Ser. No. 10/144,754, Apparatus For And Method Of Pattern Recognition And Image Analysis) for some constants $K_1$, $K_2$, $K_3$.

When g denotes the determinant of the metric tensor $g_{ij}$ and semi colon denotes the covariant derivative and comma denotes an ordinary derivative as commonly used in differential geometry.

It appears that minimizing the term that involves only the field $p_i$ is responsible for minimizing the field intensity between the two boundaries and minimizing terms that involve derivatives of the field, such as $P_{i;j}$ is responsible that the field p will not lose geometric structure as it changes from the boundary, $(-d<x^1<d,-d<x^2<d, \ldots x^j, \ldots -d<x^n<d)$ to the boundary, $(-d<x^1<d,-d<x^2<d, \ldots x^j+\delta, \ldots ,-d<x^n<d)$.

It seems that for fields that are the gradient of some scalar function (conserving fields) minimizing, $$\int_\Omega \left(K_1 P_i P^i + K_3\left(\frac{(P^\lambda P_\lambda)_{;m} P^m}{P^i P_i}\right)^2\right)\sqrt{g}\, d\Omega$$

is sufficient.

The theory and method that will unfold is of purely geometric meaning and with typical Riemannian formalism. The Lagrangians result as described below.

The Transformatron theory can further be explained as follows. Let us consider a specific Lagrangian of the form $$L\left(g_{\mu\nu}, \frac{\partial g_{\mu\nu}}{\partial x^m}, P^i, \frac{\partial P^i}{\partial x^m}\right) \quad (1)$$

Such that $x^m$ is our local coordinates system.

$g_{\mu\nu}$ is the metric tensor and $P^i$ is a contravariant vector field.

From now on semi colon ';' will 1 denote covariant derivative and comma ',' will denote ordinary derivative as in the following examples, $$P^i{}_{,j} \equiv \frac{\partial P^i}{\partial x^j},$$

$$P^i{}_{;j} \equiv \frac{\partial P^i}{\partial x^j} + \Gamma^i_{k\,j} P^k$$

when $\Gamma^i_{k\,j}$ are the Christoffel symbols $$\Gamma^i_{k\,j} \equiv \frac{1}{2} g^{is}(g_{sk,j} + g_{js,k} - g_{kj,s}).$$

We can now write a simple Lagrangian $$\left(K_2\left(\frac{(P_r{}_{;s} - P_s{}_{;r})(P_L{}_{;k} - P_k{}_{;L})g^{rL}P^sP^k}{P^iP_i} + \frac{(P^\lambda P_\lambda)_{,m}(P^sP_s)_{,k}\,g^{mk}}{P^iP_i}\right) + K_3\left(\frac{(P^\lambda P_\lambda)_{,m} P^m}{P^iP_i}\right)^2\right)\sqrt{g} \quad (2)$$

The motivation for (2) is explained in further detail below.

Definition 1: The Lagrangian (2) is the Riemannian Far Span k Distance Connection. The term $$L = \left(\frac{(P^\lambda P_\lambda)_{,m} P^m}{P^iP_i}\right)^2 \sqrt{g}$$

turns out to be very useful in high dimensional pattern matching tasks in the field of analog computation and visual analysis.

Minimizing this term means that the square norm of the field $P_i$ along it's curves stays as stationary as possible. In directions perpendicular to the field $P_i$, the field intensity is allowed to change. This is why (2.3) is a preferable Lagrangian for describing a field related to matter. An example of a real problem is two parallel $R^2$ boards in $R^3$ on which an image is encoded using an electric field.

One board encodes a memorized image and the other encodes a new input. The boards are divided into tiny pixels such that in the middle of each pixel there is an electrode. The potential of the memorized image pixels is positive and the potential of the pixels of the input image is negative. Between the two boards needle shaped pieces of conductive material are suspended in liquid. These needle shaped pieces are coated with non-conductive spheres of polyethylene.

Since dipoles respond to the gradient of the square norm of an electric field, the needles will align such that this gradient will be minimized along the direction they point to. L doesn't exactly describe this machine but is basically designed as a result of the same general topological idea.

Please note that (2) uses first order derivatives of $P_i$, providing $P_i = \sqrt{\rho} U_i$ for pattern density $\rho$.

$$\left(\frac{(P_r{}_{;s} - P_s{}_{;r})(P_L{}_{;k} - P_k{}_{;L})g^{rL}P^sP^k}{P^iP_i}\right)\sqrt{g} = \quad (2.1)$$

$$\left(\frac{(P_r{}_{;s} - P_s{}_{;r})(P_L{}_{;k} - P_k{}_{;L})g^{rL}P^sP^k}{P^iP_i}\right)\sqrt{g}$$

Definition 2: The Lagrangian (2.1) is named Angular or Curl deviation.

$$L = \frac{(P^\lambda P_\lambda)_{,m}(P^sP_s)_{,k}\,g^{mk}}{P^iP_i}\sqrt{-g} = \quad (2.2)$$

$$\frac{(P_\mu{}_{;m}P_\lambda + P_\mu P_\lambda{}_{;m})g^{\mu\lambda}(P_r{}_{;k}P_s + P_rP_s{}_{;k})g^{rs}g^{mk}}{P^iP_i}\sqrt{g}$$

Definition 3: The Lagrangain (2.2) is named, Forward Deviation.

Another form is Forward Deviation for Conserving Fields.

$$\left(\frac{(P^\lambda P_\lambda)_{,m} P^m}{P^iP_i}\right)^2 \sqrt{g} \quad (2.3)$$

The equation $$\delta \int_\Omega \left(\begin{array}{l} K_1 P_i P^i + \\ K_2\left(\frac{(P_r{}_{;s} - P_s{}_{;r})}{(P_L{}_{;k} - P_k{}_{;L})g^{rL}P^sP^k}\frac{(P^\lambda P_\lambda)_{,m}}{P^iP_i} + \frac{(P^sP_s)_{,k}\,g^{mk}}{P^iP_i}\right) + \\ K_3\left(\frac{(P^\lambda P_\lambda)_{,m} P^m}{P^iP_i}\right)^2 + \\ K_4 R \end{array}\right) \quad (2.4)$$

$$\sqrt{g}\,d\Omega = 0$$

is also referred to as a Transformatron.

Figure 17:
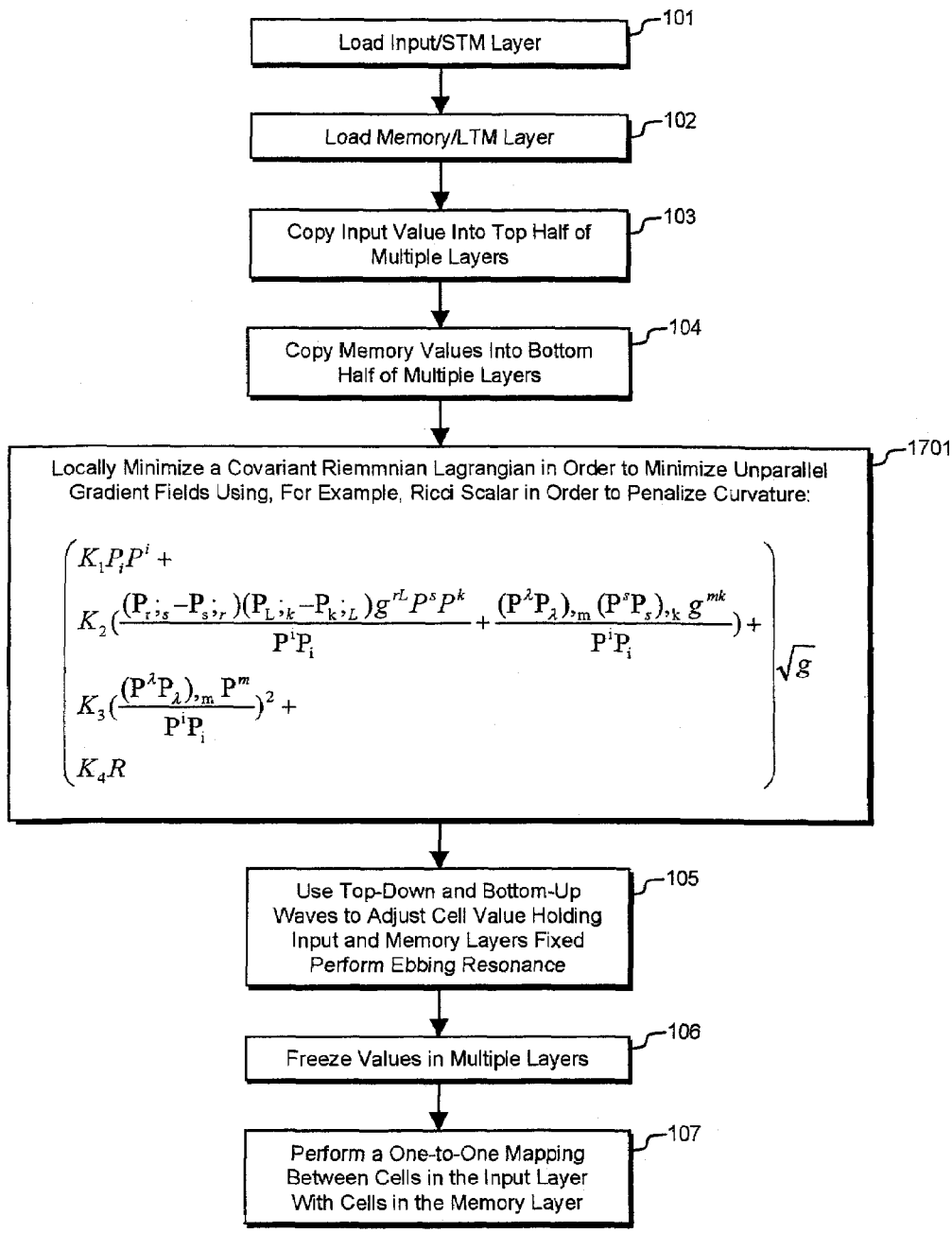
FIG. 17 shows a flow diagram of another embodiment of the transformation engine data processing of the present invention.

The present embodiment can be summarized by the flow diagram of FIG. 17 in which new step 1701 is performed following loading of the memory and input patterns and is followed by use of vibrational waves as described in the prior embodiment. A possible constraint is presented later. If $P_i$ is a gradient of some scalar function then in (2.4) $K_2$ can be 0.

Conversely, if $P_i$ is not a gradient of a scalar function then $K_3$ can be 0.

In any case $K_2=0$ yields a more stable theory.

A difficult question is whether $K_4=0$ yields a flat geometry theory. $K_2$ (or $K_3$) is a result of optimization of $$\int_\Omega (P^i P_i)^m \sqrt{g}\, d\Omega,$$

for some m>0, by (2.3) and is determined by knowing $K_1$. g is the determinant of the metric tensor in space-time, R is the Ricci scalar field and $\Omega$ is a domain of the form, $(-d<x^1<d, -d<x^2<d, \ldots x^j, \ldots -d<x_n<d)$, $(-d<x^1<d, -d<x^2<d, \ldots x^j+\delta, \ldots, -d<x^n<d)$.

Clearly (2),(2.1),(2.2) are scalar densities (see, David Lovelock and Hanno Rund, Tensors, Differential Forms and Variational Principles page 113, 2.18, and the transformation law in page 114, 2.30, 4.2 The Numerical Relative Tensors, ISBN 0-486-65840-6) Additional constraints may be also required to define a unique solution.

A thorough differential geometry discussion on how to reach (2.1) and (2.2) is included hereinbelow. However, a difficult and important open problem is whether there is an operator of the form, $$L = \left(\frac{1}{4} K\left(\frac{(P^\lambda P_\lambda)_{,m} (P^s P_s)_{,k} g^{mk}}{P^i P_i}\right) + P^s P_s\right)\sqrt{g} \quad (2.5)$$

or preferably $L = \left(\frac{1}{4} K\left(\frac{(P^\lambda P_\lambda)_{,m} P^m}{P^i P_i}\right)^2 + P^s P_s\right)\sqrt{g}$ s.t. $P=\sqrt{R}$, the root of Ricci scalar and $P_s=(\sqrt{R})_{,s}$, such that the forth order Euler Lagrange operator of L will yield a tensor with a new physical meaning. Until now, attempts did not succeed to prove that there is such a non-trivial tensor in which third and fourth order derivatives of the metric tensor do not vanish. The significance of that open problem is due to section 7 and the introduction because structure conservation cost and curvature may yield a purely metric classical theory. The failure is partly due to lack of clear mathematical theories on Lagrangians with order of derivatives of the metric tensor which is higher than 2. (2.4) is defined as a Transformatron problem if the Ricci scalar $P=\sqrt{R}$ is known on two three dimensional boundaries, $(-d<x^1<d,-d<x^2<d,-d<x^3<d,x^4)$, $(-d<x^1<d,-d<x^2<d,-d<x^3<d,x^4+\delta)$.

We proceed with the purpose of showing that the Euler Lagrange operator of (2.4) yields tensor densities.

The forward deviation may be addressed as follows. We will calculate Euler Lagrange operators (see, David Lovelock and Hanno Rund, Tensors, Differential Forms and Variational Principles page 323, 5.2, Combined Vector-Metric Field Theory, Page 325, Remark 1, ISBN 0-486-65840-6) in order to prove that they yield tensor density and thus the model is a feasible physical model.

$$EU(L\ g_{\mu\nu}\ g_{\mu\nu,m}) = \frac{\partial L}{\partial g_{\mu\nu}} - \frac{d}{dx^m}\frac{\partial L}{\partial g_{\mu\nu,m}} \quad (3)$$

$$L = \frac{(P^\lambda P_\lambda)_{,m} (P^z P_z)_{,k}}{P^i P_i}\sqrt{g}$$

-continued $$\frac{\partial L}{\partial g_{\mu\nu,m}} = 2\left(\frac{P^\mu P^\nu Z^m}{P^i P_i}\right)\sqrt{g} \quad \text{s.t.}\ Z^m = (P^i P_i)_{,j}\ g^{jm} \quad (4)$$

We now calculate, $$-\frac{d}{dx^m}\frac{\partial L}{\partial g_{\mu\nu,m}} = \quad (5)$$

$$-2\frac{((P^\mu P^\nu Z^m)_{;m} - P^i P^\nu Z^m \Gamma^\mu_{i\,m} - P^\mu P^i Z^m \Gamma^\nu_{i\,m})}{P^i P_i}\sqrt{g} +$$

$$+2\frac{(P^\mu P^\nu Z^m)(P^r P_r)_{,m} \sqrt{g}}{(P^i P_i)^2}$$

In which the term $$-P^i P^\nu Z^m \Gamma^\mu_{i\,m} - P^\mu P^i Z^m \Gamma^\nu_{i\,m} \quad (6)$$

spoils the tensor density character of (5).

Please note the following:

$$\frac{\partial \sqrt{g}}{\partial x^m} = \Gamma^i_{mi}\sqrt{g} \quad (7)$$

Please also note $$P^\mu P^\nu Z^i \Gamma^m_{i\,m}\sqrt{g} = P^\mu P^\nu Z^m \Gamma^i_{mi}\sqrt{g} = P^\mu P^\nu Z^m \frac{\partial \sqrt{g}}{\partial x^m} \quad (8)$$

Which led to the first term in (5). We continue calculating, $$\frac{\partial L}{\partial g_{\mu\nu}} = \quad (9)$$

$$\left(2\frac{P^\mu_{;m} P^\nu Z^m + P^\mu P^\nu_{;m} Z^m - \Gamma^\mu_{i\,m} P^i P^\nu Z^m - \Gamma^\nu_{i\,m} P^\mu P^i Z^m}{P^i P_i} + \right.$$

$$\frac{(P^\lambda P_\lambda)_{,m} (P^s P_s)_{,k}\left(g^{m\nu}g^{\mu k} - \frac{1}{2}g^{m\mu}g^{\nu k}\right)}{P^i P_i} +$$

$$-\frac{(P^\lambda P_\lambda)_{,m} (P^s P_s)_{,k}\ g^{mk}}{(P^i P_i)^2}P^\mu P^\nu +$$

$$\left.\frac{1}{2}\frac{(P^\lambda P_\lambda)_{,m} (P^s P_s)_{,k}\ g^{mk}}{P^i P_i}g^{\mu\nu}\right)\sqrt{g}$$

Please note $$\frac{\partial g^{mk}}{\partial g_{\mu\nu}} = g^{m\nu}g^{\mu k} - \frac{1}{2}g^{m\mu}g^{\nu k} \quad (10)$$

So the non-tensor components of (5) are the same as in (9) which assures that the following is a tensor density, $$\frac{\partial L}{\partial g_{\mu\nu}} - \frac{d}{dx^m}\frac{\partial L}{\partial g_{\mu\nu,m}} = \quad (11)$$

-continued $$\begin{cases} 2\dfrac{P^{\mu}{}_{;m}P^{\nu}Z^{m} + P^{\mu}P^{\nu}{}_{;m}Z^{m} - \Gamma^{\mu}_{im}P^{i}P^{\nu}Z^{m} - \Gamma^{\nu}_{im}P^{\mu}P^{i}Z^{m}}{P^{i}P_{i}} + \\ \dfrac{(P^{\lambda}P_{\lambda}),_{m}\,(P^{s}P_{s}),_{k}\left(g^{m\nu}g^{\mu k} - \dfrac{1}{2}g^{m\mu}g^{\nu k}\right)}{P^{i}P_{i}} + \\ -\dfrac{(P^{\lambda}P_{\lambda}),_{m}\,(P^{s}P_{s}),_{k}\,g^{mk}}{(P^{i}P_{i})^{2}}P^{\mu}P^{\nu} + \\ \dfrac{1}{2}\dfrac{(P^{\lambda}P_{\lambda}),_{m}\,(P^{s}P_{s}),_{k}\,g^{mk}}{P^{i}P_{i}}g^{\mu\nu} \\ -2\dfrac{((P^{\mu}P^{\nu}Z^{m});_{m} - P^{i}P^{\nu}Z^{m}\Gamma^{\mu}_{im} - P^{\mu}P^{i}Z^{m}\Gamma^{\nu}_{im})}{P^{i}P_{i}} + \\ +2\dfrac{(P^{\mu}P^{\nu}Z^{m})(P^{r}P_{r}),_{m}}{(P^{i}P_{i})^{2}} \end{cases}\sqrt{g}$$

In which the terms $-P^{i}P^{\nu}Z^{m}\Gamma^{\mu}_{im} - P^{\mu}P^{i}Z^{m}\Gamma^{\nu}_{im}$ cancel each other which clearly shows (11) is a tensor density.

We continue calculating the other Euler Lagrange terms, $$\frac{\partial L}{\partial P_{\mu,\nu}} = 2\frac{(P^{\mu}Z^{\nu} + P^{\nu}Z^{\mu})}{P^{i}P_{i}}\sqrt{g} \qquad (12)$$

$$-\frac{d}{dx^{\nu}}\frac{\partial L}{\partial P_{\mu,\nu}} = -2\frac{((P^{\mu}Z^{\nu} + P^{\nu}Z^{\mu});_{\nu} - \Gamma^{\mu}_{i\nu}P^{i}Z^{\nu} - \Gamma^{\mu}_{i\nu}P^{\nu}Z^{i})}{P^{i}P_{i}}\sqrt{g} + \qquad (13)$$
$$2\frac{(P^{\mu}Z^{\nu} + P^{\nu}Z^{\mu})}{(P^{i}P_{i})^{2}}(P^{i}P_{i}),_{\nu}\sqrt{g}$$

$$\frac{\partial L}{\partial P_{\mu}} = 4\frac{(P^{\mu};_{\nu}Z^{\nu} - \Gamma^{\mu}_{ik}P^{i}Z^{k})}{P^{i}P_{i}}\sqrt{g} + -2\frac{(P^{\lambda}P_{\lambda}),_{m}\,(P^{s}P_{s}),_{k}\,g^{mk}}{(P^{i}P_{i})^{2}}P^{\mu}\sqrt{g} \qquad (14)$$

Adding (14) and (13) we have $$\frac{\partial L}{\partial P_{\mu}} - \frac{d}{dx^{\nu}}\frac{\partial L}{\partial P_{\mu,\nu}} = \qquad (15)$$
$$4\frac{(P^{\mu};_{\nu}Z^{\nu} - \Gamma^{\mu}_{ik}P^{i}Z^{k})}{P^{i}P_{i}}\sqrt{g} + -2\frac{(P^{\lambda}P_{\lambda}),_{m}\,(P^{s}P_{s}),_{k}\,g^{mk}}{(P^{i}P_{i})^{2}}P^{\mu}\sqrt{g} -$$
$$2\frac{((P^{\mu}Z^{\nu} + P^{\nu}Z^{\mu});_{\nu} - \Gamma^{\mu}_{i\nu}P^{i}Z^{\nu} - \Gamma^{\mu}_{i\nu}P^{\nu}Z^{i})}{P^{i}P_{i}}\sqrt{g} +$$
$$2\frac{(P^{\mu}Z^{\nu} + P^{\nu}Z^{\mu})}{(P^{i}P_{i})^{2}}(P^{i}P_{i}),_{\nu}\sqrt{g}$$

Clearly (15) is a tensor density because:

$$-4\Gamma^{\mu}_{ik}P^{i}Z^{k} = -2(\Gamma^{\mu}_{i\nu}P^{i}Z^{\nu} + \Gamma^{\mu}_{i\nu}P^{\nu}Z^{i}) \qquad (16)$$

By (11) and (15) that we have proved, the Euler Lagrange operators of (2.2) is indeed a tensor density.

Angular/Curl deviation is addressed as follows. We will calculate the Euler Lagrange operators for $$L = \left(\frac{(P_{r,s} - P_{s,r})(P_{L,k} - P_{k,L})g^{rL}P^{s}P^{k}}{P^{i}P_{i}}\right)\sqrt{g}$$

Obviously $$\frac{\partial L}{\partial g_{\mu\nu,m}} = 0 \qquad (17)$$

We continue with $$\frac{\partial L}{\partial g_{\mu\nu}} = \frac{\partial}{\partial g_{\mu\nu}}\left(\frac{(P_{r,s} - P_{s,r})(P_{L,k} - P_{k,L})g^{rL}g^{sZ}g^{kU}P_{Z}P_{U}}{P^{i}P_{i}}\right)\sqrt{g} \qquad (18)$$

We continue by calculating, $$\frac{\partial(g^{rL}g^{sZ}g^{kU})P_{Z}P_{U}(P_{r,s} - P_{s,r})(P_{L,k} - P_{k,L})}{\partial g_{\mu\nu}} = \qquad (19)$$
$$\left(g^{r\nu}g^{\mu L} - \frac{1}{2}g^{r\mu}g^{\nu L}\right)g^{sZ}g^{kU}P_{Z}P_{U}(P_{r,s} - P_{s,r})(P_{L,k} - P_{k,L}) +$$
$$g^{rL}\left(g^{s\nu}g^{\mu Z} - \frac{1}{2}g^{s\mu}g^{\nu Z}\right)g^{kU}P_{Z}P_{U}(P_{r,s} - P_{s,r})(P_{L,k} - P_{k,L}) +$$
$$g^{rL}g^{sZ}\left(g^{k\nu}g^{\mu U} - \frac{1}{2}g^{k\mu}g^{\nu U}\right)P_{Z}P_{U}(P_{r,s} - P_{s,r})(P_{L,k} - P_{k,L}) =$$
$$\left(g^{r\nu}g^{\mu L} - \frac{1}{2}g^{r\mu}g^{\nu L}\right)P^{s}P^{k}(P_{r,s} - P_{s,r})(P_{L,k} - P_{k,L}) +$$
$$\left(g^{s\nu}P^{\mu} - \frac{1}{2}g^{s\mu}P^{\nu}\right)P^{k}g^{rL}(P_{r,s} - P_{s,r})(P_{L,k} - P_{k,L}) +$$
$$\left(g^{k\nu}P^{\mu} - \frac{1}{2}g^{k\mu}P^{\nu}\right)P^{s}g^{rL}(P_{r,s} - P_{s,r})(P_{L,k} - P_{k,L})$$

So we can write, $$\frac{\partial L}{\partial g_{\mu\nu}} - \frac{d}{dx^{m}}\frac{\partial L}{\partial g_{\mu\nu,m}} = \frac{\partial L}{\partial g_{\mu\nu}} = \qquad (20)$$
$$\begin{cases}\left(g^{r\nu}g^{\mu L} - \dfrac{1}{2}g^{r\mu}g^{\nu L}\right)P^{s}P^{k}(P_{r,s} - P_{s,r})(P_{L,k} - P_{k,L}) + \\ \left(g^{s\nu}P^{\mu} - \dfrac{1}{2}g^{s\mu}P^{\nu}\right)P^{k}g^{rL}(P_{r,s} - P_{s,r})(P_{L,k} - P_{k,L}) + \\ \left(g^{k\nu}P^{\mu} - \dfrac{1}{2}g^{k\mu}P^{\nu}\right)P^{s}g^{rL}(P_{r,s} - P_{s,r})(P_{L,k} - P_{k,L})\end{cases}\frac{\sqrt{g}}{P_{i}P^{i}} +$$
$$-\left(\frac{(P_{r,s} - P_{s,r})(P_{L,k} - P_{k,L})g^{rL}g^{sZ}g^{kU}P_{Z}P_{U}}{(P^{i}P_{i})^{2}}\right)P^{\mu}P^{\nu}\sqrt{g} +$$
$$\frac{1}{2}\left(\frac{(P_{r,s} - P_{s,r})(P_{L,k} - P_{k,L})g^{rL}g^{sZ}g^{kU}P_{Z}P_{U}}{P^{i}P_{i}}\right)g^{\mu\nu}\sqrt{g}$$

It will be recognized that (20) is a tensor density.

We continue by calculating $$\frac{\partial L}{\partial P_{\mu,\nu}} = 2\left(\frac{F^{\mu}_{k}P^{\nu}P^{k} - F^{\nu}_{k}P^{\mu}P^{k}}{P^{i}P_{i}}\right)\sqrt{g}\ \ s.t.\ \ F_{\mu\nu} = (P_{\mu,\nu} - P_{\nu,\mu}) \qquad (21)$$

We may write $$2\left(\frac{F_k^\mu P^\nu P^k - F_k^\nu P^\mu P^k}{P^i P_i}\right)\sqrt{g} = 2\frac{B^{\mu\nu}}{P^i P_i}\sqrt{g} \qquad (22)$$

It should be apparent that $$B^{\mu\nu} = -B^{\nu\mu} \qquad (23)$$

which is of crucial importance as will be apparent.
We continue calculating, $$-\frac{d}{dx^m}\frac{\partial L}{\partial P_{\mu,\nu}} = \qquad (24)$$

$$-2(B^{\mu\nu}{}_{;\nu} - B^{k\nu}\Gamma^\mu_{k\nu})\sqrt{g} +$$

$$2\left(\frac{F_k^\mu P^\nu P^k - F_k^\nu P^\mu P^k}{(P^i P_i)^2}\right)(P^i P_i)_{,\nu}\sqrt{g}$$

By (23) we have $$B^{k\nu}\Gamma^\mu_{k\nu} = 0 \qquad (25)$$

So (24) reduces to, $$-\frac{d}{dx^m}\frac{\partial L}{\partial P_{\mu,\nu}} = \qquad (26)$$

$$-2\frac{B^{\mu\nu}{}_{;\nu}}{P^i P_i}\sqrt{g} +$$

$$2\left(\frac{F_k^\mu P^\nu P^k - F_k^\nu P^\mu P^k}{(P^i P_i)^2}\right)(P^i P_i)_{,\nu}\sqrt{g}$$

which is obviously a tensor density.
We continue calculating, $$\frac{\partial L}{\partial P_\mu} = \frac{\partial}{\partial P_\mu}\left(\frac{F_{rs}F_k^r P_z P_u g^{sz} g^{ku}}{P^i P_i}\right)\sqrt{g} = \qquad (27)$$

$$\left(\frac{F_r^\mu F_k^r P^k + F_{rs}F^{r\mu} P^s}{P^i P_i}\right)\sqrt{g} +$$

$$-2\left(\frac{F_{rs}F_k^r P_z g^{sz} g^{ku}}{(P^i P_i)^2}\right)P^\mu \sqrt{g}$$

Adding (27) and (26) we have, $$\frac{\partial L}{\partial P_\mu} - \frac{d}{dx^\nu}\frac{\partial L}{\partial P_{\mu,\nu}} = \frac{\partial}{\partial P_\mu}\left(\frac{F_{rs}F_k^r P_z P_u g^{sz} g^{ku}}{P^i P_i}\right)\sqrt{g} = \qquad (28)$$

$$\left(\frac{F_r^\mu F_k^r P^k + F_{rs}F^{r\mu} P^s}{P^i P_i}\right)\sqrt{g} +$$

$$-2\left(\frac{F_{rs}F_k^r P_z P_u g^{sz} g^{ku}}{(P^i P_i)^2}\right)P^\mu \sqrt{g} +$$

$$-2\frac{B^{\mu\nu}{}_{;\nu}}{P^i P_i}\sqrt{-g} +$$

$$2\left(\frac{F_k^\mu P^\nu P^k - F_k^\nu P^\mu P^k}{(P^i P_i)^2}\right)(P^i P_i)_{,\nu}\sqrt{g}$$

(28) is a tensor density. So we have proved that the Euler Lagrange operators of the Angular (or Curl) deviations yield tensor densities as required by physics. We therefore can consider (2.3) as a possible theory.

To address the forward deviation for conserving fields we calculate Euler Lagrange operators (see, Lovelock et al., supra) in order to prove that they yield tensor density and thus the model is a feasible physical model.

$$EU(L\ g_{\mu\nu}\ g_{\mu\nu,m}) = \frac{\partial L}{\partial g_{\mu\nu}} - \frac{d}{dx^m}\frac{\partial L}{\partial g_{\mu\nu,m}} \qquad (29)$$

$$L = \left(\frac{(P^\lambda P_\lambda)_{,m} P^m}{P^i P_i}\right)^2 \sqrt{g}$$

$$\frac{\partial L}{\partial g_{\mu\nu,m}} = 2\left(\frac{(P^\lambda P_\lambda)_{,s} P^s}{P^i P_i}\right)\frac{P^\mu P^\nu P^m}{P^i P_i}\sqrt{g} \qquad (30)$$

We now calculate, $$-\frac{d}{dx^m}\frac{\partial L}{\partial g_{\mu\nu,m}} = \qquad (31)$$

$$-2\left(\frac{(P^\lambda P_\lambda)_{,s} P^s}{P^i P_i}\right)$$

$$\frac{(P^\mu P^\nu P^m)_{;m} - P^i P^\nu P^m \Gamma^\mu_{im} - P^\mu P^i P^m \Gamma^\nu_{im}}{P^i P_i}\sqrt{g} +$$

$$-2\left(\frac{(P^\lambda P_\lambda)_{,s} P^s}{P^i P_i}\right)_{,m}\frac{(P^\mu P^\nu P^m)}{P^i P_i}\sqrt{g} +$$

$$+2\left(\frac{(P^\lambda P_\lambda)_{,s} P^s}{P^i P_i}\right)\frac{(P^\mu P^\nu P^m)(P^r P_r)_{,m}}{(P^i P_i)^2}\sqrt{g}$$

In which the term $$-P^i P^\nu P^m \Gamma^\mu_{im} - P^\mu P^i Z^m \Gamma^\nu_{im} \qquad (32)$$

spoils the tensor density character of (31).
Please note the following:

$$\frac{\partial \sqrt{g}}{\partial x^m} = \Gamma^i_{mi}\sqrt{g} \qquad (33)$$

Please also note, $$P^\mu P^\nu P^i \Gamma^m_{im}\sqrt{g} = P^\mu P^\nu P^m \Gamma^i_{mi}\sqrt{g} = P^\mu P^\nu P^m \frac{\partial \sqrt{g}}{\partial x^m} \qquad (34)$$

Which led to the first term in (31). We continue calculating, $$\frac{\partial L}{\partial g_{\mu\nu}} = \qquad (35)$$

$$\left(\begin{array}{l} 2\left(\frac{(P^\lambda P_\lambda)_{,s} P^s}{P^i P_i}\right)\frac{\Gamma^\mu_{im} P^i P^\nu P^m - \Gamma^\nu_{im} P^\mu P^i P^m}{P^i P_i} + \\ -2\left(\frac{(P^\lambda P_\lambda)_{,s} P^s}{P^i P_i}\right)\frac{(P^\lambda P_\lambda)_{,m} P^m}{(P^i P_i)^2} P^\mu P^\nu + \\ \frac{1}{2}\left(\frac{(P^\lambda P_\lambda)_{,m} P^m}{P^i P_i}\right)^2 g^{\mu\nu} \end{array}\right)\sqrt{g}$$

So the non-tensor components of (31) are the same as in (35) which assures that the following is a tensor density, $$\frac{\partial L}{\partial g_{\mu\nu}} - \frac{d}{dx^m}\frac{\partial L}{\partial g_{\mu\nu,m}} = \quad (36)$$

$$\left( 2\left(\frac{(P^\lambda P_\lambda)_{,s} P^s}{P^i P_i}\right) \frac{P^\mu_{;m} P^\nu P^m + P^\mu P^\nu_{;m} P^m - \Gamma^\mu_{i\,m} P^i P^\nu P^m - \Gamma^\nu_{i\,m} P^\mu P^i P^m}{P^i P_i} + \right.$$

$$-2\left(\frac{(P^\lambda P_\lambda)_{,s} P^s}{P^i P_i}\right)\frac{(P^\lambda P_\lambda)_{,m} P^m}{(P^i P_i)^2} P^\mu P^\nu +$$

$$\frac{1}{2}\left(\frac{(P^\lambda P_\lambda)_{,m} P^m}{P^i P_i}\right)^2 g^{\mu\nu} +$$

$$-2\left(\frac{(P^\lambda P_\lambda)_{,s} P^s}{P^i P_i}\right)\frac{(P^\mu P^\nu P^m)_{;m} - P^i P^\nu P^m \Gamma^\mu_{i\,m} - P^\mu P^i P^m \Gamma^\nu_{i\,m})}{P^i P_i} +$$

$$-2\left(\frac{(P^\lambda P_\lambda)_{,s} P^s}{P^i P_i}\right)_{,m}\frac{(P^\mu P^\nu P^m)}{P^i P_i} +$$

$$\left. +2\left(\frac{(P^\lambda P_\lambda)_{,s} P^s}{P^i P_i}\right)\frac{(P^\mu P^\nu P^m)(P^r P_r)_{,m}}{(P^i P_i)^2} \right) \sqrt{g}$$

In which the terms $-P^i P^\nu P^m \Gamma^\mu_{i\,m} - P^\mu P^i P^m \Gamma^\nu_{i\,m}$ cancel each other which clearly shows (36) is a tensor density.

We continue calculating the other Euler Lagrange terms, $$\frac{\partial L}{\partial P_{\mu,\nu}} = 4\left(\frac{(P^\lambda P_\lambda)_{,s} P^s}{P^i P_i}\right)\frac{P^\mu P^\nu}{P^i P_i}\sqrt{g} \quad (37)$$

$$-\frac{d}{dx^\nu}\frac{\partial L}{\partial P_{\mu,\nu}} = \quad (38)$$

$$-4\left(\frac{(P^\lambda P_\lambda)_{,s} P^s}{P^i P_i}\right)\frac{(P^\mu P^\nu)_{;\nu} - \Gamma^\mu_{i\,\nu} P^i P^\nu}{P^i P_i}\sqrt{g} +$$

$$-4\left(\frac{(P^\lambda P_\lambda)_{,s} P^s}{P^i P_i}\right)_{,\nu}\frac{P^\mu P^\nu}{P^i P_i}\sqrt{g} +$$

$$+4\left(\frac{(P^\lambda P_\lambda)_{,s} P^s}{P^i P_i}\right)\frac{(P^\mu P^\nu)}{(P^i P_i)^2}(P^i P_i)_{,\nu}\sqrt{g}$$

$$\frac{\partial L}{\partial P_\mu} = \quad (39)$$

$$4\left(\frac{(P^\lambda P_\lambda)_{,s} P^s}{P^i P_i}\right)\frac{(P^\mu_{;\nu} P^\nu - \Gamma^\mu_{i\,k} P^i P^k)}{P^i P_i}\sqrt{g} +$$

$$-4\frac{(P^\lambda P_\lambda)_{,m} P^m}{(P^i P_i)^2} P^\mu \sqrt{g}$$

Adding (38) and (39) we have $$\frac{\partial L}{\partial P_\mu} - \frac{d}{dx^\nu}\frac{\partial L}{\partial P_{\mu,\nu}} = \quad (40)$$

$$+4\left(\frac{(P^\lambda P_\lambda)_{,s} P^s}{P^i P_i}\right)\frac{(P^\mu_{;\nu} P^\nu - \Gamma^\mu_{i\,k} P^i P^k)}{P^i P_i}\sqrt{g} +$$

$$-4\frac{(P^\lambda P_\lambda)_{,m} P^m}{(P^i P_i)^2} P^\mu \sqrt{g} +$$

$$-4\left(\frac{(P^\lambda P_\lambda)_{,s} P^s}{P^i P_i}\right)\frac{(P^\mu P^\nu)_{;\nu} - \Gamma^\mu_{i\,\nu} P^i P^\nu}{P^i P_i}\sqrt{g} +$$

-continued $$-4\left(\frac{(P^\lambda P_\lambda)_{,s} P^s}{P^i P_i}\right)_{,\nu}\frac{P^\mu P^\nu}{P^i P_i}\sqrt{g} +$$

$$+4\left(\frac{(P^\lambda P_\lambda)_{,s} P^s}{P^i P_i}\right)\frac{(P^\mu P^\nu)}{(P^i P_i)^2}(P^i P_i)_{,\nu}\sqrt{g}$$

It is apparent that (40) is a tensor density because the non-tensor terms cancel each other.

The motivation for the Lagrangian presented in (2) above may be explained by first providing a definition for the term "Transformatron". In particular, the geometric meaning of the "Transformatron" may be described as follows. According to one explanation, the Transformatron functions by "penalizing" the Lagarngian for a vector field which is not geodesic, can yield a global minimum of another integral under certain restrictions. This penalty (or cost function) in turn, can take part of the "job" that Ricci tensor does, which means that our vector field will not have to be geodesic but deviation from a geodesic field will have to be "penalized". We bear in mind that the term "job" refers to a deep Differential Topology issue which is known as Stable Homotopy. See, e.g., Guillemin et al., supra). Moreover, the original Transformatron was an image processing device and was implemented as a complex triangular grid structure and space was not considered as a continuum.

We continue by repeating the following, suppose we have a scalar field $P_i$ who's values are known on the Gaussian coordinates boundaries, $(-d<x^1<d,-d<x^2<d, \ldots x^j, \ldots -d<x_n<d), (-d<x^1<d,-d<x^2<d \ldots x^j+\delta, \ldots,-d<x^n<d)$.

Now we want to minimize $P_iP^i$ on one hand and keep the field as geodesic as possible in flat geometry. We assume that the Euler Number (see, John W. Milnor, Topology from the Differentiable Viewpoint, pages 32-41, ISBN 0-691-04833-9) of our vector field $P_i$ is 0 in every point of the vacuo. This is a necessary condition for the following technique to work ! If our field $P_i$ is smooth and doesn't posses catastrophic Euler Numbers, then differential geometry tells us that there exists an arc length curve $x^i(s)$ such that $$\frac{dx^i(s)}{ds} = \frac{P^i}{\sqrt{P^L P_L}} \quad (41)$$

Such a curve is geodesic only if $$\frac{d^2 x^i(s)}{ds^2} = 0 \quad (42)$$

$$\frac{d^2 x^i(s)}{ds^2} = \left(\frac{P^i}{\sqrt{P^L P_L}}\right)_{;\nu}\frac{d}{ds}x^\nu = \quad (43)$$

$$\left(\frac{P^i}{\sqrt{P^L P_L}}\right)_{;\nu}\frac{P^\nu}{\sqrt{P^L P_L}} =$$

$$\left(\frac{P^i_{;\nu}}{(P^L P_L)^{\frac{1}{2}}} - \frac{1}{2}\frac{P^i}{(P^L P_L)^{\frac{3}{2}}}(P^L P_L)_{;\nu}\right)\frac{P^\nu}{(P^L P_L)^{\frac{1}{2}}} =$$

$$\left(\frac{P^i_{;\nu} P^\nu}{(P^L P_L)} - \frac{1}{2}\frac{P^i}{(P^L P_L)^2}(P^L P_L)_{;\nu} P^\nu\right) = 0$$

If our geodesic field $P_i$ fulfills the following, $P_{i;j}=P_{j;i}$ or in other words, is a conserving field, then it is sufficient for the norm of the field to be stationary along the curve $x^i(s)$ because then $$(P_i P_j g^{ij})_{;m} = (P_{i;m}P^i + P_{j;m}P^j) = 0 P_{i;m}P^i = 0 \quad (44)$$

by which it is obvious that (43) vanishes.

If we want to construct a cost function term that relies solely on the derivatives of the square norm of a vector field then we will have a problem when the field is not conserving.

One elegant way to solve this problem is to look at the following terms, $$V^r = (P_{r;s} + P_{s;r}) \frac{P^s}{\sqrt{P^i P_i}} \quad (45)$$

$$U^r = (P_{r;s} - P_{s;r}) \frac{P^s}{\sqrt{P^i P_i}} = (P_{r;s} - P_{s;r}) \frac{P^s}{\sqrt{P^i P_i}} \quad (46)$$

(2.1) is simply $U_r U^r \sqrt{-g}$ and (2.2) is simply $V_r V^r \sqrt{-g}$.

In the past I used to think that $$\left( \frac{(P_{r;s} + P_{s;r}) P^r P^s}{P^i P_i} \right)^2 \sqrt{-g} \quad (47)$$

or its identical form, $$\left( \frac{(P^\lambda P_\lambda)_{;m} P^m}{P^i P_i} \right)^2 \sqrt{-g} \quad (48)$$

are preferable tensor densities because (48) has a clear topological meaning and is more stable in pattern recognition engineering applications.

If for example, $P_i = \sqrt{\rho} U_i$ for some scalar field $\rho$ then 48 is not sensitive to gradiends of $\rho$ which are perpendicular to the field $P_i$ that is if $$\frac{P_i}{2\sqrt{\rho}} \rho^i = 0.$$

This is a very useful property because a gradient $\rho^i$ can represent structural information and forcing it to 0 causes this information to be lost.

The problem is that $$\left( \frac{(P_{r;s} - P_{s;r}) P^r P^s}{P^i P_i} \right)^2 \sqrt{-g} \equiv 0 \quad (49)$$

which is not useful if $P_i$ is not a conserving field. (2.1) solves that problem.

The problem that was left was to show that the Euler Lagrange operators of (2.1) (2.2) and (2.3) are indeed tensor densities. That is a critical condition for considering such a theory to describe Nature.

We can thus conclude that Stable Homotopy need not require geodesics to exist but does require to minimize deviations from the geodesics properties of the field that describes matter in vacuo.

As described, the Energy function which is also described herinabove as Far Span k-Distance Connection can be extended to Riemannian geometry in the example forms 2.4 and 2.5. Further, the system referred to as the Transformatron can be numerically simulated such that the memory layer, the input layer and the domain in between will all be described as coordinates of Riemannian manifold and thus allow convergence for difficult transformations between the pattern stored in the input layer and the pattern that is stored in the memory layer.

The above referenced conservation constraint may be explained as follows. A natural constraint relates to the conservation of matter and can be $$\int_\Omega \frac{(P^\lambda P_\lambda)_{;m} P^m}{P^i P_i} \sqrt{-g} \, d\Omega = 0 \quad (A)$$

Adding the constraint (A) to (2) we have $$\delta \int_\Omega \begin{pmatrix} K_1 P_i P^i + \\ K_2 \left( \begin{array}{c} (P_{r;s} - P_{s;r}) \quad (P^\lambda P_\lambda)_{;m} \\ \frac{(P_{L;k} - P_{k;L}) g^{rL} P^s P^k}{P^i P_i} + \frac{(P^s P_s)_{;k} g^{mk}}{P^i P_i} \end{array} \right) + \\ R + \\ +(K_3 + \lambda) \frac{(P^\lambda P_\lambda)_{;m} P^m}{P^i P_i} + K_4 R \end{pmatrix} \sqrt{-g} \, d\Omega = 0 \quad (B)$$

(A) along with (B) define a constrained variational equation.

In this case the constant $\lambda$ can be chosen to be $-K_3$ and yield a theory in which a non-conserving field is not lost or added to vacuo.

The present application includes a significant amount of theory and derivation of equations. This information is included to assist one skilled in the art in understanding the invention in detail. The inclusion of this theory and these derivations are not intended or included to limit the present invention.

It should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A method of comparing an input pattern with a memory pattern comprising the steps of:
   loading a representation of said input pattern into cells in an input layer;
   loading a representation of said memory pattern into cells in a memory layer;
   loading an initial value into cells in an intermediate layers between said input layer and said memory layer;

comparing values of cells in said intermediate layers with values stored in cells of adjacent layers including calculating a minimum energy connection in curved space from said cell in said intermediate layer to said cells in said intermediate layers;

updating values stored in cells in said intermediate layers based on said step of comparing; and mapping cells in said memory layer to cells in said input layer.

2. The method of claim 1 wherein said curved space is defined in Riemmanian geometry.

3. The method of claim 1 wherein the minimum energy is written as:

$$\left( \begin{array}{l} K_1 P_i P^i + \\ K_2 \left( \dfrac{(P_r;{}_s - P_s;{}_r)}{} \quad (P^\lambda P_\lambda)_{,m} \right) \\ K_2 \left( \dfrac{(P_L;{}_k - P_k;{}_L) g^{rL} P^s P^k}{P^i P_i} + \dfrac{(P^s P_s)_{,k} \, g^{mk}}{P^i P_i} \right) + \\ K_3 \left( \dfrac{(P^\lambda P_\lambda)_{,m} \, P^m}{P^i P_i} \right)^2 + \\ K_4 R \end{array} \right) \sqrt{\pm g}$$

where: g is the determinant of the metric tensor, upper indices denote contravariant tensor property, lower indices denote covariant tensor properties, $P_i$ denotes a gradient $$P_i \equiv \frac{\partial P}{\partial x^i}$$

of a gradually changing function P, that changes between the memory and input layers, $(-d<x^1<d, -d<x^2<d, \ldots x^j, \ldots -d<x^n<d)$, $(-d<x^1<d, -d<x^2<d, \ldots x^j+\delta, \ldots, -d<x^n<d)$ (when n is the dimension of a Riemannian manifold and d>0 is a very large in relation to $\delta>0$), semi colon denotes a covariant derivative and comma denotes an ordinary derivative, $$P_{i,j} \equiv \frac{\partial P_i}{\partial x^j}.$$

R denotes the scalar curvature also known as Ricci scalar, and $K_1, K_2, K_3, K_4$ denote constants of the model.

4. The method of claim 1 further including a step of:
ascertaining said representation of said input pattern by preprocessing said input pattern.

5. The method of claim 1 further including a step of:
ascertaining said representation of said memory pattern by preprocessing said memory pattern.

6. The method of claim 1 wherein at least one of said initial values loaded into said cells in said intermediate layers are identical to said representation of said input pattern.

7. The method of claim 1 wherein at least one of said initial values loaded into said cells in said intermediate layers are identical to said representation of said memory pattern.

8. The method of claim 1 wherein said step of comparison includes comparing said value in said cell with values in three adjacent cells in said adjacent layer.

9. The method of claim 1 wherein said step of comparison includes calculating a distance in curved space from said cell in said intermediate layer to said cells in said intermediate layers.

10. The method of claim 1 wherein said step of mapping cells includes the steps of:
introducing a vibration wave into a cell of said input layer.

11. A method of comparing an input pattern with a memory pattern comprising the steps of:
loading a representation of said input pattern into cells in an input layer;
loading a representation of said memory pattern into cells in a memory layer;
loading an initial value into cells in an intermediate layers between said input layer and said memory layer;
comparing values of cells in said intermediate layers with values stored in cells of adjacent layers through curved space;
updating values stored in cells in said intermediate layers based on said step of comparing; and
mapping cells in said memory layer to cells in said input layer including introducing a vibration wave into a cell of said input layer.

12. The method of claim 11 wherein said curved space is defined in Riemmanian geometry.

13. The method of claim 11 wherein said step of comparing includes a step of calculating a minimum energy connection in said curved space from said cells in said intermediate layer to said cells in said intermediate layers.

14. The method of claim 13 wherein the minimum energy is written as:

$$\left( \begin{array}{l} K_1 P_i P^i + \\ K_2 \left( \dfrac{(P_r;{}_s - P_s;{}_r)}{} \quad (P^\lambda P_\lambda)_{,m} \right) \\ K_2 \left( \dfrac{(P_L;{}_k - P_k;{}_L) g^{rL} P^s P^k}{P^i P_i} + \dfrac{(P^s P_s)_{,k} \, g^{mk}}{P^i P_i} \right) + \\ K_3 \left( \dfrac{(P^\lambda P_\lambda)_{,m} \, P^m}{P^i P_i} \right)^2 + \\ K_4 R \end{array} \right) \sqrt{\pm g}$$

where: g is the determinant of the metric tensor, upper indices denote contravariant tensor property, lower indices denote covariant tensor properties, $P_i$ denotes a gradient $$P_i \equiv \frac{\partial P}{\partial x^i}$$

of a gradually changing function P, that changes between the memory and input layers, $(-d<x^1<d, -d<x^2<d, \ldots x^j, \ldots -d<x^n<d)$, $(-d<x^1<d, -d<x^2<d, \ldots x^j+\delta, \ldots, -d<x^n<d)$ (when n is the dimension of a Riemannian manifold and d>0 is a very large in relation to $\delta>0$), semi colon denotes a covariant derivative and comma denotes an ordinary derivative, $$P_{i,j} \equiv \frac{\partial P_i}{\partial x^j}.$$

R denotes the scalar curvature also known as Ricci scalar, and $K_1, K_2, K_3, K_4$ denote constants of the model.

15. The method of claim 11 further including a step of:
ascertaining said representation of said input pattern by preprocessing said input pattern.

16. The method of claim 11 further including a step of:
ascertaining said representation of said memory pattern by preprocessing said memory pattern.

17. The method of claim 11 wherein at least one of said initial values loaded into said cells in said intermediate layers are identical to said representation of said input pattern.

18. The method of claim 11 wherein at least one of said initial values loaded into said cells in said intermediate layers are identical to said representation of said memory pattern.

19. The method of claim 11 wherein said step of comparison includes comparing said value in said cell with values in three adjacent cells in said adjacent layer.

20. The method of claim 11 wherein said step of comparison includes calculating a distance in curved space from said cell in said intermediate layer to said cells in said intermediate layers.

21. An apparatus for comparing an input pattern with a memory pattern, the apparatus comprising:
means for loading a representation of said input pattern into cells in an input layer;
means for loading a representation of said memory pattern into cells in a memory layer;
means for loading an initial value into cells in an intermediate layers between said input layer and said memory layer;
means for comparing values of cells in said intermediate layers with values stored in cells of adjacent layers including calculating a minimum energy connection in curved space from said cell in said intermediate layer to said cells in said intermediate layers;
means for updating values stored in cells in said intermediate layers based on said step of comparing; and
means for mapping cells in said memory layer to cells in said input layer.

22. The apparatus of claim 21 wherein said curved space is defined in Riemmanian geometry.

23. The method of claim 21 wherein the minimum energy is written as:

$$\left( \begin{array}{l} K_1 P_i P^i + \\ K_2 \left( \dfrac{(P_r;_s - P_s;_r)}{P^i P_i} \dfrac{(P_{L;k} - P_{k;L})g^{rL}P^s P^k}{P^i P_i} + \dfrac{(P^\lambda P_\lambda)_{;m}}{P^i P_i} \dfrac{(P^s P_s)_{;k} g^{mk}}{P^i P_i} \right) + \\ K_3 \left( \dfrac{(P^\lambda P_\lambda)_{;m} P^m}{P^i P_i} \right)^2 + \\ K_4 R \end{array} \right) \sqrt{\pm g}$$

where: g is the determinant of the metric tensor, upper indices denote contravariant tensor property, lower indices denote covariant tensor properties, $P_i$ denotes a gradient $$P_i \equiv \dfrac{\partial P}{\partial x^i}$$

of a gradually changing function P, that changes between the memory and input layers, $(-d<x^1<d, -d<x^2<d, \ldots x^j, \ldots -d<x^n<d)$, $(-d<x^1<d, -d<x^2<d, \ldots x^j+\delta, \ldots, -d<x^n<d)$ (when n is the dimension of a Riemannian manifold and d>0 is a very large in relation to δ>0), semi colon denotes a covariant derivative and comma denotes an ordinary derivative, $$P_{i,j} \equiv \dfrac{\partial P_i}{\partial x^j}.$$

R denotes the scalar curvature also known as Ricci scalar, and $K_1, K_2, K_3, K_4$ denote constants of the model.

24. The apparatus of claim 21 further including means for ascertaining said representation of said input pattern by preprocessing said input pattern.

25. The apparatus of claim 21 further including means for ascertaining said representation of said memory pattern by preprocessing said memory pattern.

26. The apparatus of claim 21 wherein at least one of said initial values loaded into said cells in said intermediate layers are identical to said representation of said input pattern.

27. The apparatus of claim 21 wherein at least one of said initial values loaded into said cells in said intermediate layers are identical to said representation of said memory pattern.

28. The apparatus of claim 21 wherein means for comparing includes means for comparing said value in said cell with values in three adjacent cells in said adjacent layer.

29. The apparatus of claim 21 wherein said means for comparing includes means for calculating a distance in curved space from said cell in said intermediate layer to said cells in said intermediate layers.

30. The apparatus of claim 21 wherein said means for mapping cells includes means for introducing a vibration wave into a cell of said input layer.

31. An apparatus for comparing an input pattern with a memory pattern, the apparatus comprising:
means for loading a representation of said input pattern into cells in an input layer;
means for loading a representation of said memory pattern into cells in a memory layer;
means for loading an initial value into cells in an intermediate layers between said input layer and said memory layer;
means for comparing values of cells in said intermediate layers with values stored in cells of adjacent layers comparing values of cells in said intermediate layers with values stored in cells of adjacent layers through curved space;
means for updating values stored in cells in said intermediate layers in response to said means for comparing; and
means for mapping cells in said memory layer to cells in said input layer including introducing a vibration wave into a cell of said input layer.

32. The apparatus of claim 31 wherein said curved space is defined in Riemmanian geometry.

33. The apparatus of claim 31 wherein said means for comparing includes means for calculating a minimum energy connection in said curved space from said cells in said intermediate layer to said cells in said intermediate layers.

34. The apparatus of claim 33 wherein the minimum energy is written as:

$$\left( \begin{array}{l} K_1 P_i P^i + \\ K_2 \left( \dfrac{(P_{r;s} - P_{s;r})(P_{L;k} - P_{k;L})g^{rL}P^s P^k}{P^i P_i} + \dfrac{(P^\lambda P_\lambda)_{;m} (P^s P_s)_{;k} g^{mk}}{P^i P_i} \right) + \\ K_3 \left( \dfrac{(P^\lambda P_\lambda)_{;m} P^m}{P^i P_i} \right)^2 + K_4 R \end{array} \right) \sqrt{\pm g}$$

where: g is the determinant of the metric tensor, upper indices denote contravariant tensor property, lower indices denote covariant tensor properties, $P_i$ denotes a gradient $$P_i \equiv \frac{\partial P}{\partial x^i}$$

of a gradually changing function P, that changes between the memory and input layers, $(-d<x^1<d, -d<x^2<d, \ldots -d<x^n<d)$, $(-d<x^1<d, -d<x^2<d, \ldots x^j+\delta, \ldots, -d<x^n<d)$ (when n is the dimension of a Riemannian manifold and d>0 is a very large in relation to $\delta>0$), semi colon denotes a covariant derivative and comma denotes an ordinary derivative, $$P_{i,j} \equiv \frac{\partial P_i}{\partial x^j}.$$

R denotes the scalar curvature also known as Ricci scalar, and $K_1, K_2, K_3, K_4$ denote constants of the model.

35. The apparatus of claim 31 further including means for ascertaining said representation of said input pattern by pre-processing said input pattern.

36. The apparatus of claim 31 further including means for ascertaining said representation of said memory pattern by preprocessing said memory pattern.

37. The apparatus of claim 31 wherein at least one of said initial values loaded into said cells in said intermediate layers are identical to said representation of said input pattern.

38. The apparatus of claim 31 wherein at least one of said initial values loaded into said cells in said intermediate layers are identical to said representation of said memory pattern.

39. The apparatus of claim 31 wherein said means for comparing includes means for comparing said value in said cell with values in three adjacent cells in said adjacent layer.

40. The apparatus of claim 31 wherein said means for comparing includes means for calculating a Euclidean distance from said cell in said intermediate layer to said cells in said intermediate layers.

* * * * *

UNITED STATES PATENT AND TRADEMARK OFFICE
CERTIFICATE OF CORRECTION

PATENT NO.      : 7,424,462 B2
APPLICATION NO. : 10/810651
DATED           : September 9, 2008
INVENTOR(S)     : Yossi Avni et al.

It is certified that error appears in the above-identified patent and that said Letters Patent is hereby corrected as shown below:

Column 4, Line 30, delete the portion of the equation reading "$((x-x_1)^2+(y-y_1)+(z-z_1)^2)$" and replace with --$((x-x_1)^2+(y-y_1)^2+(z-z_1)^2)$--.

Column 4, Line 40, delete the portion of the equation reading "$(i_1-i_2)^{2+j}{}_1-j_2)_2$" and replace with --$(i_1-i_2)^2 + (j_1-j_2)^2$--.

Column 5, Line 26, delete the portion of the equation reading "$D((x, y),(x^1, y_1))$" and replace with --$D((x, y), (x_1, y_1))$--.

Column 7, Line 12, delete the portion of the equation reading "$| U(s, t)$" and replace with --$| U(s, t)$--.

Column 7, Line 15, delete the portion of the equation reading "$| U(s, t)$" and replace with --$| U(s, t)$--.

Column 14, Line 67, delete the portion of the equation reading "$U(s+1, i+1)$" and replace with --$U(s+1, i+1)|$--.

Column 16, Line 8, delete the portion text reading "I/R" and replace with --1/R--.

Column 19, Line 64, delete the portion of the equation found in column 3 and row 3 of the matrix reading "$\frac{\partial^2 p}{\partial z \partial y}$" and replace with --$\frac{\partial^2 p}{\partial z \partial z}$--.

UNITED STATES PATENT AND TRADEMARK OFFICE
CERTIFICATE OF CORRECTION

PATENT NO. : 7,424,462 B2
APPLICATION NO. : 10/810651
DATED : September 9, 2008
INVENTOR(S) : Yossi Avni et al.

It is certified that error appears in the above-identified patent and that said Letters Patent is hereby corrected as shown below:

Column 20, Line 11, delete the portion of the equation found in column 3 and row 3 of the matrix reading " $\frac{\partial^2 p}{\partial z \partial y}$ " and replace with -- $\frac{\partial^2 p}{\partial z \partial z}$ --.

Column 20, Line 19, delete the portion of the equation found in column 3 and row 3 of the matrix reading " $\frac{\partial^2 p}{\partial z \partial y} \frac{\partial p}{\partial z}$ " and replace with -- $\frac{\partial^2 p}{\partial z \partial z} \frac{\partial p}{\partial z}$ --.

Column 35, Line 16, delete the portion of the equation reading "... -d<$x_n$<d)," and replace with --... -d<$x^n$<d),--.

Column 43, Line 6, delete the portion of the equation reading "=0$P_i$;" and replace with --= 0 $\Rightarrow$ $P_i$;--.

In the Claims,

Column 49, Claim 34, Line 10, delete the portion of the equation reading "... -d<$x^n$<d)," and replace with --...$x^j$,... -d<$x^n$<d),--.

Signed and Sealed this

Twenty-eighth Day of October, 2008

JON W. DUDAS
*Director of the United States Patent and Trademark Office*